(12) United States Patent
Kaminski

(10) Patent No.: US 12,287,415 B1
(45) Date of Patent: Apr. 29, 2025

(54) ZERO-BALANCE PHASE MEASUREMENT CIRCUIT

(71) Applicant: Walter J. Kaminski, Long Valley, NJ (US)

(72) Inventor: Walter J. Kaminski, Long Valley, NJ (US)

( * ) Notice: Subject to any disclaimer, the term of this patent is extended or adjusted under 35 U.S.C. 154(b) by 0 days.

(21) Appl. No.: 18/910,497

(22) Filed: Oct. 9, 2024

(51) Int. Cl.
*G01S 3/48* (2006.01)
*G01S 3/04* (2006.01)

(52) U.S. Cl.
CPC ............... *G01S 3/48* (2013.01); *G01S 3/043* (2013.01)

(58) Field of Classification Search
CPC .................................. G01S 3/48; G01S 13/43
USPC .............................. 342/118, 195, 442, 357.44
See application file for complete search history.

(56) References Cited

U.S. PATENT DOCUMENTS

| | | | | |
|---|---|---|---|---|
| 6,429,802 | B1 * | 8/2002 | Roberts | G01V 3/12 342/195 |
| 6,772,091 | B1 * | 8/2004 | Roberts | G01N 23/223 342/118 |
| 7,187,452 | B2 * | 3/2007 | Jupp | G01S 7/497 356/3.01 |

OTHER PUBLICATIONS

Edge Alasdair, Dr., White Paper; "Angle of Arrival/Direction Finding Techniques", CFRS Limited, 2023, pp. 1-17.

* cited by examiner

*Primary Examiner* — Bo Fan

(74) *Attorney, Agent, or Firm* — Hoffmann & Baron, LLP

(57) ABSTRACT

A zero-balance phase measurement apparatus includes first and second hybrid couplers, each of the hybrid couplers including an input port for receiving an RF signal, and first and second output ports, the second output port generating a 90-degree phase shift relative to the first output port. The first output port of the first hybrid coupler and the second output port of the second hybrid coupler are connected to first and second inputs, respectively, of a first phase detector. The first output port of the second hybrid coupler and the second output port of the first hybrid coupler are connected to first and second inputs, respectively, of a second phase detector. The apparatus is configured to generate a zero-balance phase output signal as a function of first and second phase difference signals generated by the first and second phase detectors, respectively.

23 Claims, 19 Drawing Sheets

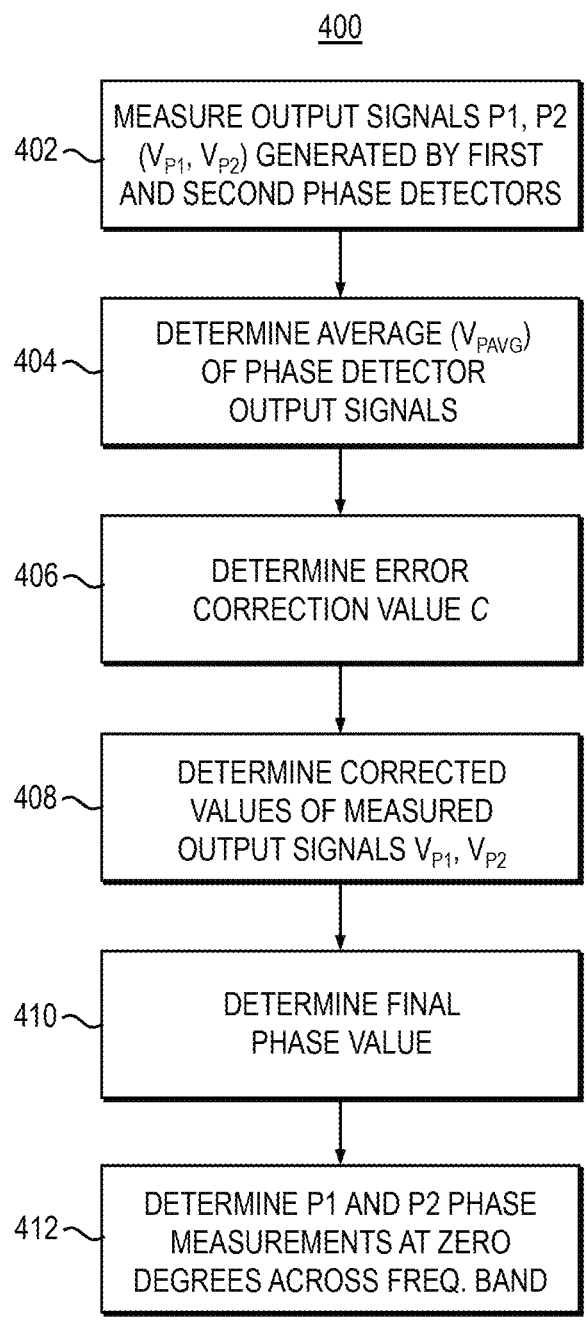

ZERO-BALANCE PHASE MEASUREMENT CIRCUIT

FIELD

The present disclosure relates generally to radio direction-finding, and, more particularly, relates to zero-balance phase measurement circuitry for use in radio direction-finding and other applications.

BACKGROUND

Radio direction-finding (RDF) generally involves the use of radio waves (e.g., radio frequency (RF) signals) to determine the direction of origination of a radio signal source. The radio signal source may be, for example, a radio transmitter or a naturally-occurring radio signal source (like microwave ovens). Using triangulation, the location of a radio signal source can be determined by measuring its direction from two or more locations. Radio direction-finding is used in numerous applications, such as, but not limited to, radio navigation (e.g., as support backup for global positioning system (GPS) navigation) for vehicles, aircraft and ships, search and rescue (e.g., using radio signals from emergency beacons), wildlife tracking, locating interfering transmitters, etc. In a military application, radio direction finding can be an important tool for locating the position of an enemy transmitter (e.g., enemy communications and jamming).

Many RDF systems use phase comparison or Doppler techniques. The ability to compare the phase of signals has led to phase-comparison radio direction-finding, which is perhaps the most widely used technique in modern times. Conventional RDF equipment, however, is often bulky and heavy, thereby making it impractical for use as a wearable device in a portable RDF application. Furthermore, standard RDF equipment is typically very complex to achieve a high degree of accuracy.

SUMMARY

The present inventive concept, as manifested in one or more embodiments, provides a solution to the problem of phase imbalance in a two-antenna array where phase difference measurements are used to determine angle of arrival (AOA) of a received RF signal incident wave field. The AOA of a signal may be defined as the direction from which the signal (e.g. radio, optical or acoustic) is received. In one or more embodiments, zero- and 90-degree electrical phase pairing of adjacent antennas spaced one-quarter wavelength apart is used to achieve enhanced RF signal AOA accuracy. In some embodiments, the antenna zero- and 90-degree phase pairing and summing of phase detector measurements for a two-antenna sensor value should add up to zero degrees, which may be a midpoint of the phase detector. In one or more embodiments, a correction value is obtained using these initial measurements, which may be averaged and subtracted from the "true" zero; this correction value is added to the initial measurements to provide corrected initial phase values. The corrected initial phase values represent a zero-balance phase measurement technique according to one or more embodiments of the present disclosure.

In accordance with an embodiment of the present disclosure, a zero-balance phase measurement apparatus includes: a first hybrid coupler comprising a first input port configured to receive a first RF signal from a first receiving element, and first and second output ports, the second output port generating a 90-degree phase shift relative to the first output port; and a second hybrid coupler comprising a second input port configured to receive an RF signal from a second receiving element, and third and fourth output ports, the fourth output port generating a 90-degree phase shift relative to the third output port. The first output port is coupled to a first input of a first phase detector, the second output port is coupled to a second input of a second phase detector, the third output port is coupled to a first input of the second phase detector, and the fourth output port is coupled to a second input of the first phase detector. The zero-balance phase measurement apparatus is configured to generate a zero-balance phase output signal as a function of first and second phase difference signals generated by the first and second phase detectors, respectively, the first phase difference signal being indicative of a phase difference between respective signals at the first and second inputs of the first phase detector, and the second phase difference signal being indicative of a phase difference between respective signals at the first and second inputs of the second phase detector.

In accordance with another embodiment of the present disclosure, a wearable sensor for tracking a direction of RF signals includes first and second hybrid devices, first and second phase detectors coupled to the first and second hybrid devices, respectively, and first and second voltage-controlled oscillators (VCOs) coupled to the first and second phase detectors, respectively. The first hybrid device includes a first input port configured to receive a first RF signal from a first receiving element, and first and second output ports. The first hybrid device is configured to generate a zero-degree phase shift of the first RF signal at the first output port and to generate a 90-degree phase shift of the first RF signal at the second output port. The second hybrid device includes a second input port configured to receive a second RF signal from a second receiving element, and third and fourth output ports. The second hybrid device is configured to generate a zero-degree phase shift of the second RF signal at the third output port and to generate a 90-degree phase shift of the second RF signal at the fourth output port. The first output port is coupled to a first input of the first phase detector, the second output port is coupled to a second input of the second phase detector, the third output port is coupled to a first input of the second phase detector, and the fourth output port is coupled to a second input of the first phase detector. The first VCO is configured to generate a first output signal as a function of a phase difference between respective signals at the first and second inputs of the first phase detector. The second VCO is configured to generate a second output signal as a function of a phase difference between respective signals at the first and second inputs of the second phase detector. The direction of the RF signals is determined as a function of the first and second output signals.

In accordance with an embodiment of the present disclosure, a zero-balance phase measurement circuit includes: a first hybrid coupler comprising a first input port configured to receive a first radio RF signal from a first receiving element, and first and second output ports, the second output port having a 90-degree phase with respect to the first output port; a second hybrid coupler comprising a second input port configured to receive a second RF signal from a second receiving element, and third and fourth output ports, the fourth output port having a 90-degree phase with respect to the third output port; a first phase detector comprising first and second inputs and a first output, the first phase detector generating a first phase difference signal at the first output that is indicative of a phase difference between respective signals at the first and second inputs thereof; and a second phase detector comprising third and fourth inputs and a second output, the second phase detector generating a second phase difference signal at the second output that is indicative of a phase difference between respective signals at the third and fourth inputs thereof. The first output port is coupled to the first input of the first phase detector, the second output port is coupled to the fourth input of the second phase detector, the third output port is coupled to the third input of the second phase detector, and the fourth output port is coupled to the second input of the first phase detector. The zero-balance phase measurement circuit is configured to generate a zero-balance phase output signal as a function of a mutually opposite or polarity difference between the first and second phase difference signals.

In accordance with another embodiment of the present disclosure, a method for determining angle of arrival of an RF signal includes: measuring a first phase difference signal and a second phase difference signal generated by first and second phase detectors, respectively; determining an average phase difference voltage of the first and second phase difference signals; calculating a phase error correction value by subtracting the average phase difference voltage from an ideal zero phase value; generating corrected first and second phase difference signals by adding the phase error correction value to the measured first and second phase difference signals; and determining a final phase value based on the corrected first and second phase difference signals.

In accordance with an embodiment of the present disclosure, a method of tracking a direction of an RF signal includes: providing a first hybrid device configured to receive a first RF signal and to generate a zero-degree phase shift of the first RF signal at a first output port and to generate a 90-degree phase shift of the first RF signal at a second output port; providing a second hybrid device configured to receive a second RF signal and to generate a zero-degree phase shift of the second RF signal at a third output port and to generate a 90-degree phase shift of the second RF signal at a fourth output port; generating a first phase difference signal by comparing the zero-degree phase shift of the first RF signal and the 90-degree phase shift of the second RF signal; generating a second phase difference signal by comparing the zero-degree phase shift of the second RF signal and the 90-degree phase shift of the first RF signal; generating a first output signal whose oscillation frequency is controlled as a function of the first phase difference signal; and generating a second output signal whose oscillation frequency is controlled as a function of the second phase difference signal. The direction of the RF signal is obtained as a function of the first and second output signals.

Techniques of the present inventive concept can provide substantial beneficial technical effects. By way of example only and without limitation, techniques according to embodiments of the present disclosure may provide one or more of the following advantages, among other benefits:
 enhanced RF signal angle of arrival accuracies;
 reduced phase errors using a compact printed circuit board (PCB) integrated antenna/zero-balance phase measurement circuit design;
 may be configured to measure phase balance on paired dual channel circuits (e.g., dual-channel RF amplifiers, filters, switches, etc.) where accurate dual channel circuits require zero phase balance across a frequency band of interest;
 may be configured to incorporating instantaneous frequency measurement (IFM) using a zero-balance phase measurement circuit according to aspects of the inventive concept with front end delay line;
 may be configured to use frequency information for making adjustments to phase slope constants, which will reduce AOA errors while operating in different portions of the frequency band;
 easy to fabricate using standard and repeatable PCB manufacturing processes;
 plug and play compatible design;
 scalable antenna sizing and spatial dimensions configurable for use with different frequency bands of RF signals depending on the application;
 configurable as a phase direction finder sensor that integrates into a reduced package size ideal for mounting on small platforms, including hand-held units and wearables;
 when used as a tracking device (e.g., wearables), no tuning is required.

These and other features and advantages of the present inventive concept will become apparent from the following detailed description of illustrative embodiments thereof, which is to be read in connection with the accompanying drawings.

BRIEF DESCRIPTION OF THE DRAWINGS

The accompanying drawings, which are included to provide a further understanding of the invention and are incorporated in and constitute a part of this application, are presented by way of example only and without limitation, wherein like reference numerals (when used) indicate corresponding elements throughout the several views, and wherein:

FIG. 4 is a flow chart depicting illustrative steps in an example method for performing a zero-degree phase balance calculation, according to one or more embodiments of the inventive concept;

It is to be appreciated that elements in the figures may be illustrated for simplicity and clarity. Common but well-understood elements that may be useful or necessary in a commercially feasible embodiment are not necessarily shown in order to facilitate a less hindered view of the illustrated embodiments.

DETAILED DESCRIPTION

Principles of the present inventive concept, as manifested in one or more embodiments, may be described herein in the context of an enhanced radio direction-finding system, and more specifically to embodiments of a phase balance measurement circuit for use in an RDF system, and methods for using the same, among other beneficial applications. It is to be appreciated, however, that the invention is not limited to the specific devices, circuits, systems and/or methods illustratively shown and described herein. Rather, it will become apparent to those skilled in the art given the teachings herein that numerous modifications to the embodiments shown are contemplated and are within the scope of embodiments of the claimed invention. That is, no limitations with respect to the embodiments shown and described herein are intended or should be inferred. Furthermore, upon reading the following description in light of the accompanying drawings, those skilled in the art will understand the concepts of the present disclosure and will recognize applications of these concepts not particularly addressed herein. It should be understood that these concepts and applications fall within the scope of the present disclosure and the accompanying claims.

AOA-based RDF techniques all share a common task: determining the direction (i.e., angle or bearing) from which a signal (e.g., radio, optical or acoustic) is arriving. In one or more embodiments of the present disclosure, zero- and 90-degree electrical phase pairing of adjacent antennas spaced apart by a prescribed distance (e.g., about one-quarter to one-half wavelength) can be used to achieve enhanced RF signal AOA accuracy. There are three properties that can potentially change as an RF signal propagates through space: amplitude, frequency and/or phase. Since these changes are primarily a function of the path between a transmitter and receiver, RDF methodologies can calculate bearings using these location-dependent variations in the received signal. RDF techniques based on AOA use changes in amplitude, frequency, or phase to compute bearings from which the received signal is arriving.

Figure 1:
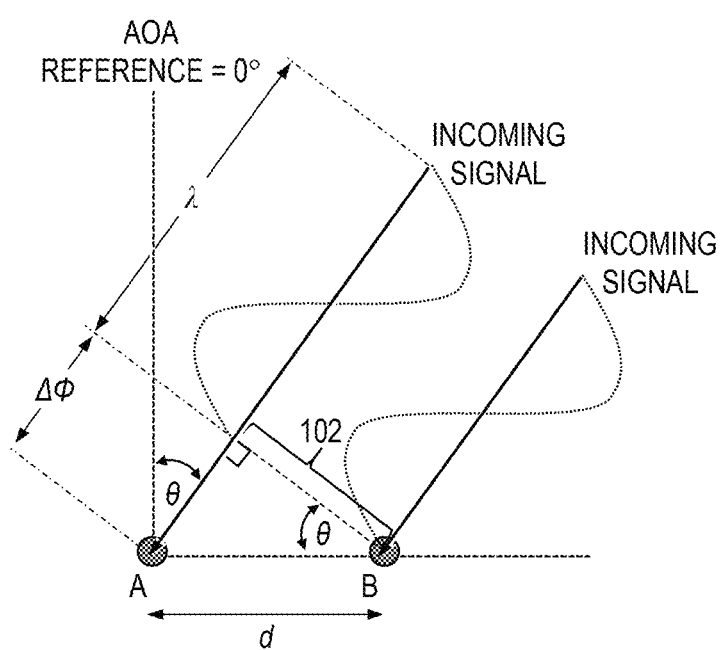
FIG. 1 is a diagram conceptually illustrating a technique for determining angle of arrival (AOA) of a radio signal using a two-antenna array.

If there are multiple antennas in an array, the phase difference, $\Delta\phi$, between an incoming signal received at the respective antennas can be used to determine the incident angle (i.e., AOA), $\theta$, of the received signal. FIG. 1 is a diagram conceptually depicting a technique for determining AOA using a two-antenna array. This same concept can be used to determine AOA in a system employing more than two antennas. Referring to FIG. 1, assume there are two adjacent antennas, A and B, separated by a distance d, and that an incoming signal will be received first by antenna B. The additional path length that the incoming signal must travel to reach antenna A compared to antenna B will be $\Delta\phi$, referring to equation 1 below; where $\theta$ is the AOA of the incoming signal, with reference to a line drawn normal (i.e., perpendicular) to a horizontal plane on which the two antennas are disposed. A planar wavefront 102 of the incoming signal may be defined by a line drawn normal from the path of the incoming signal as it approaches antenna B to the point at which the incoming signal reaches antenna A.

A phase difference, $\Delta\phi$, between the two receiving antennas A and B spaced a distance d apart can be expressed as a function of wavelength, $\lambda$, and AOA $\theta$ of the incoming signal as follows:

$$\Delta\phi = 2\pi d/\lambda \, \sin(\theta)\cos(\alpha) \quad (1)$$

where $\pi$ denotes units in radians and $\alpha$ is elevation angle. Elevation angle $\alpha$ may be defined as the angle between the horizon (as a reference plane) and the line of sight to a signal source (e.g., satellite, transmitter, etc.). Rearranging equation (1) above and solving for θ (AOA) yields the following expression:

$$\theta = \sin^{-1}(\Delta\varphi\lambda/2\pi d \cdot \cos\alpha) \quad (2)$$

Thus, if the phase difference Δϕ can be measured and if the wavelength λ of the incoming signal and the separation distance d between antennas A and B are known a priori, the AOA of the incoming signal (θ) can be determined using equation (2) above. In addition, it should be noted that the phase shift error, dθ/dϕ, responsible for an AOA error may be determined using the following expression:

$$d\theta/d\varphi = (\lambda/2\pi d \cos\theta \cdot \cos\alpha) \quad (3)$$

AOA (θ) error can be closely approximated as 2ϕ/π, using the assumption d=¼λ, elevation angle α=0, and where dϕ (phase difference) is measured near θ=0 degrees; that is, AOA=2/π for a 1-degree phase error using the above assumption. dθ/dϕ may be determined by taking a derivative of equation (1) with respect to θ and ϕ.

Phase difference Δϕ can be determined using a zero-phase balance approach, which will be described in further detail below. Furthermore, once first and second phase difference signals P1 and P2 are zero phase balance corrected (Pcor), Δϕ in equation (2) above can be closely approximated as follows: Δϕ=1.25 (Pcor−0.1)−1, where Pcor in example embodiments is in the range of about 0.1 volt to 1.7 volt. A zero phase balance correction value Pcor of 0.9 volt will provide a zero-degree AOA result using equation (2) above. The separation d=λ/4 (i.e., one quarter wavelength) between antennas sets a maximum phase where Δϕ max=±90 in electrical degrees (±π/2 in radians), in this illustrative embodiment. The maximum frequency of operation will therefore correspond to this separation criteria when using equation (2) above.

Figure 2:
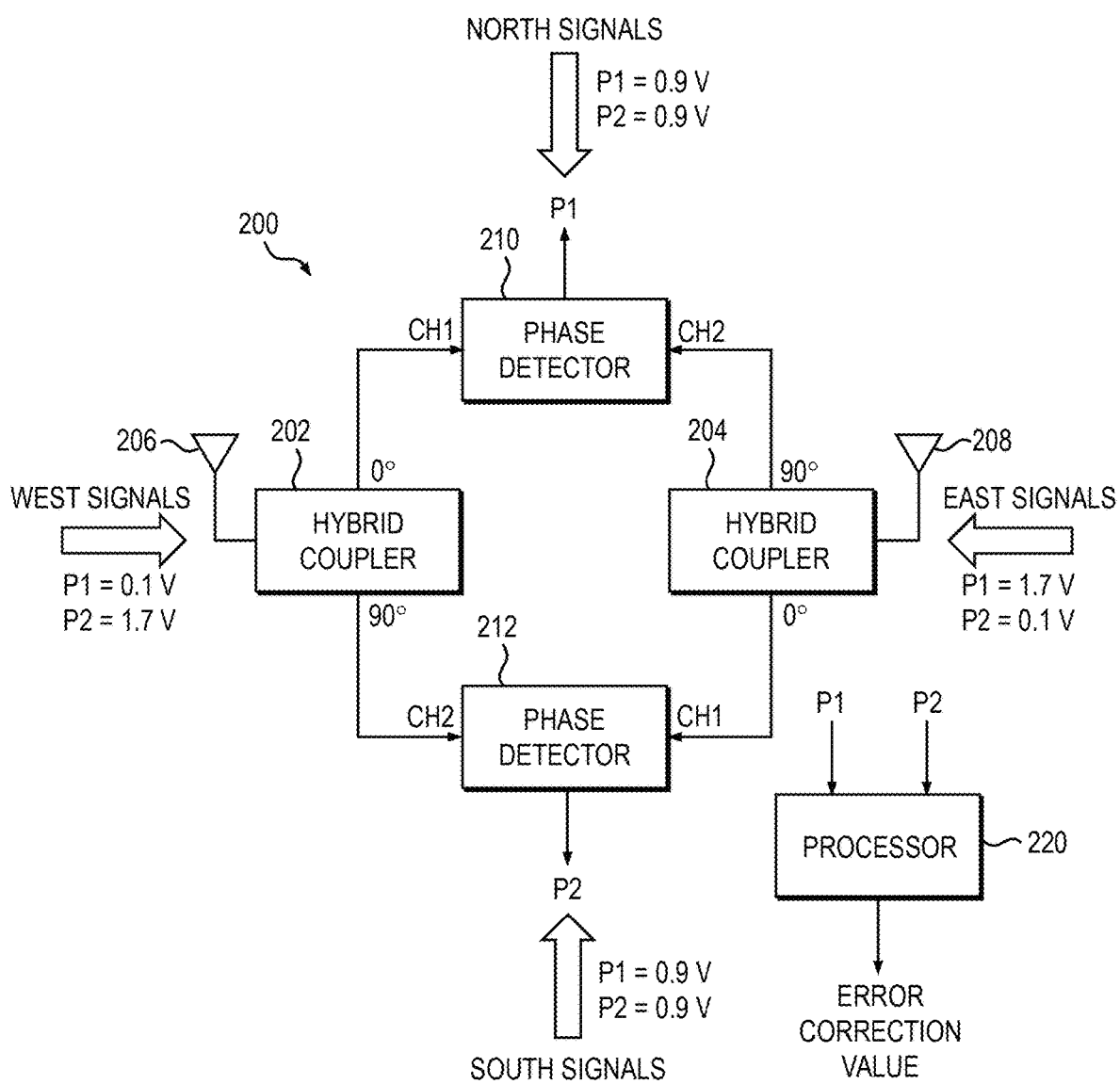
FIG. 2 is a block diagram conceptually depicting an illustrative two-antenna zero-phase balance measurement circuit, according to one or more embodiments of the inventive concept.

FIG. 2 is a block diagram conceptually depicting an illustrative two-antenna zero-phase balance measurement circuit 200, according to one or more embodiments of the inventive concept. The zero-phase balance measurement circuit 200 may be employed, for example, in a radio direction-finding system, among other beneficial applications. Referring to FIG. 2, the zero-phase balance measurement circuit 200 may include a first hybrid coupler 202 and a second hybrid coupler 204. Each of the hybrid couplers 202, 204 may also be referred to as quadrature hybrids because a signal applied to any input port will result in two equal amplitude output signals at its output ports. The signals at each of the two output ports of the hybrid coupler are attenuated by three decibels (i.e., 3 dB or 50 percent) relative to the input signal and have a 90-degree phase difference with respect to each other. It also makes no difference which port is the input port because the relationship at the output ports remains the same, as these hybrid couplers 202, 204 are electrically and mechanically symmetrical.

The first hybrid coupler 202 includes a first input port configured to receive RF signals from a first receiving element, which may be a first antenna 206 connected to the first hybrid coupler 202. The second hybrid coupler 204 includes a second input port configured to receive RF signals from a second receiving element, which may be a second antenna 208 connected to the second hybrid coupler 204. The first hybrid coupler 202 includes first and second output ports. The first output port, which may be referred to as a zero-degree (0°) output port, is configured to generate an output signal having a zero-degree phase difference with respect to the received signal at the first input port of the first hybrid coupler 204. The second output port, which may be referred to as a 90-degree (90°) output port, is configured to generate an output signal having a 90-degree phase difference with respect to the input signal at the first input port of the first hybrid coupler 204.

Similarly, the second hybrid coupler 204 includes third and fourth output ports. The third output port, which may be referred to as a zero-degree (0°) output port, is configured to generate an output signal having a zero-degree phase difference with respect to the received signal at the second input port of the second hybrid coupler 204. The fourth output port, which may be referred to as a 90-degree (90°) output port, is configured to generate an output signal having a 90-degree phase difference with respect to the input signal at the second input port of the second hybrid coupler 204.

The zero-phase balance measurement circuit 200 may further include a first phase detector 210 and a second phase detector 212. Each of the first and second phase detectors 210, 212 includes two inputs (i.e., input channels or ports), CH1 and CH2, and is configured to generate an output signal at an output port thereof that is representative of a difference in phase between two input signals presented to the respective input channels. In one or more embodiments, the first output port (0°) of the first hybrid coupler 202 is connected to a first input CH1 of the first phase detector 210, and the fourth output port (90°) of the second hybrid coupler 204 is connected to a second input CH2 of the first phase detector 210. The first phase detector 210 is configured to generate a first phase difference signal, P1, in a phase normal case that is representative of a difference in phase between the respective signals at the first and second inputs CH1, CH2 of the first phase detector 210.

The third output port (0°) of the second hybrid coupler 204 is connected to a third input CH1 of the second phase detector 212, and the second output port (90°) of the first hybrid coupler 202 is connected to a fourth input CH2 of the second phase detector 212. The second phase detector 212 is configured to generate a second phase difference signal, P2, in a phase reversal case that is representative of a difference in phase between the respective signals at the third and fourth inputs CH1, CH2 of the second phase detector 212. Taking an average value of the initial phase detector measurements and subtracting the average value from the true zero reference provides a zero-balance error correction value that can be used to rebalance the initial phase measurements.

With the zero-phase balance measurement circuit 200 connected in this manner, each phase detector 210, 212 will measure phase using a zero-degree output and a 90-degree output from the pair of hybrid couplers 202, 204 as input sources. By way of example only and without limitation or loss of generality, assume that each phase detector 210, 212 is configured having an output voltage swing of 0 to 1.8 volts (V); that is, each of the first and second phase difference signals P1, P2 may have an amplitude that varies between about 0 to 1.8 V depending on the difference in phase between the pair of zero- and 90-degree signals supplied to the inputs CH1, CH2 of the phase detector. When the input signals supplied to a given phase detector are equal in phase with respect to one another, the phase difference signal (P1 or P2) generated by the phase detector will be at a maximum of the output voltage swing, or about 1.8 V in this example. When the input signals supplied to a given phase detector are 180 degrees apart in phase, the phase difference signal generated by the phase detector will be at a minimum of the output voltage swing, or about 0 V in this example. When the input signals supplied to a given phase detector are 90 degrees apart in phase, the phase difference signal generated by the phase detector will be at a midpoint of the output voltage swing, or about 900 millivolts (mV) in this example.

Assume that the first and second antennas 206, 208 are oriented perpendicular to the direction of the incoming RF signal, so that the incoming RF signal will be received by the first and second antennas 206, 208 concurrently; this will occur when the incoming RF signal is from the north or the south in FIG. 2. In this scenario, the AOA of the incoming RF signal ($\theta$) in equation (1) above) from either the north or the south will be zero degrees. With the AOA equal to zero degrees, the phase difference between the first and second antennas 206, 208 will be zero, as confirmed by equation (1) above, and the elevation angle ($\alpha$ in equation (1)) will have no impact on the phase difference at the AOA ($\theta$) equal to zero degrees.

Although the phase difference in the incoming RF signals received at the respective first and second antennas 206, 208 will be zero degrees, the second hybrid coupler 204 is configured to introduce a 90-degree phase shift in the signal presented to the second input CH2 of the first phase detector 210. The signal from the first hybrid coupler 202 presented to the first input CH1 of the first phase detector does not introduce any phase difference (i.e., 0 degrees). Thus, the overall difference in phase between the respective signals presented to the first and second inputs CH1 and CH2 of the first phase detector 210 will be 90 degrees. Similarly, the first hybrid coupler 202 is configured to introduce a 90-degree phase shift in the signal presented to the fourth input CH2 of the second phase detector 212, while the second hybrid coupler 204 does not introduce any phase shift (i.e., 0 degrees) in the signal presented to the third input CH1 of the second phase detector 212. Therefore, the overall difference in phase between the respective signals presented to the third and fourth inputs CH1 and CH2 of the second phase detector 212 will be 90 degrees. With a phase difference of 90 degrees between the respective inputs of each of the first and second phase detectors 210, 212, each of the output phase difference signals P1 and P2 will be at midpoint, or about 900 mV in this example.

Next, consider the case where the first and second antennas 206, 208 are oriented parallel to the direction of the received RF signal. In this scenario, the elevation angle ($\alpha$) will have some impact on the phase difference, but for this illustration the elevation angle will be assumed to be zero (and therefore the $\cos(\alpha)$ term in equation (1) above can be ignored).

When the incoming RF signal originates from the west, the AOA will be +90 degrees. In this case, the signal will be initially received by the first antenna 206, and then by the second antenna 208 a prescribed time thereafter. Also assume that the first and second antennas are spaced one-quarter wavelength apart, which will therefore impart a 90-degree phase shift between the signals received at the two antennas 206, 208. The signal from the first hybrid coupler 202 supplied to the first input CH1 of the first phase detector 210 will not introduce any phase shift (i.e., 0 degrees). The signal from the second hybrid coupler 204 supplied to the second input CH2 of the first phase detector 210 will introduce a phase shift of 90 degrees which is added to the 90-degree phase shift resulting from the path delay in receiving the incoming RF signal at the second antenna 208. Thus, the overall difference in phase between the signals presented to the respective first and second inputs CH1 and CH2 of the first phase detector 210 will be 180 degrees. With a phase difference of 180 degrees between the respective inputs of the first phase detector 210, the first phase difference signal P1 will be at a minimum, or about 0.1 V (near zero) in this example.

The signal from the first hybrid coupler 202 supplied to the fourth input CH2 of the second phase detector 212 will introduce a 90-degree phase shift. The signal from the second hybrid coupler 204 supplied to the third input CH1 of the second phase detector 212 will not introduce any phase shift (i.e., 0 degrees), but this signal will have a 90-degree phase shift resulting from the path delay in receiving the incoming RF signal at the second antenna 208. Thus, the overall difference in phase between the signals presented to the third and fourth inputs CH1 and CH2 of the second phase detector 212 will be 0 degrees (since each input signal from the respective hybrid couplers will have a 90-degree phase shift relative to the incoming RF signal). With a phase difference of 0 degrees between the respective inputs of the second phase detector 212, the second phase difference signal P2 will be at a maximum, or about 1.7 V in this example.

When the incoming RF signal originates from the east, the AOA will be −90 degrees. In this case, the incoming RF signal will be initially received by the second antenna 208, and then by the first antenna 206 one-quarter wavelength (i.e., 90 degrees) later. Thus, there will be a 90-degree phase shift introduced between the signals received at the two antennas 206, 208. The signal from the second hybrid coupler 204 supplied to the second input CH2 of the first phase detector 210 will introduce a 90-degree phase shift. The signal from the first hybrid coupler 202 supplied to the first input CH1 of the first phase detector 210 will not introduce any phase shift (i.e., 0 degrees), but this signal will have a 90-degree phase shift resulting from the path delay in receiving the incoming signal at the first antenna 206. Thus, the overall difference in phase between the respective signals presented to the first and second inputs CH1 and CH2 of the first phase detector 210 will be 0 degrees (since each input signal will have a 90-degree phase shift relative to the incoming RF signal). With a phase difference of 0 degrees between the respective inputs of the first phase detector 210, the first phase difference signal P1 will be at a maximum, or about 1.7 V in this example.

The signal from the second hybrid coupler 204 supplied to the third input CH1 of the second phase detector 212 will not introduce any phase shift (i.e., 0 degrees). The signal from the first hybrid coupler 202 supplied to the fourth input CH2 of the second phase detector 212 will introduce a 90-degree phase shift, but this signal will have an additional 90-degree phase shift resulting from the path delay in receiving the incoming signal at the first antenna 206. Thus, the overall difference in phase between the respective signals presented to the third and fourth inputs CH1 and CH2 of the second phase detector 212 will be 180 degrees. With a phase difference of 180 degrees between the respective inputs of the second phase detector 212, the second phase difference signal P2 will be at a minimum, or about 0.1 V in this example.

The first and second phase difference signals P1 and P2 generated by the first and second phase detectors 210 and 212, respectively, may be provided to a processor 220 (e.g., analog-to-digital (A/D) sampling, microprocessor, central processing unit (CPU), etc.). The processor 220 may be integrated with the zero-degree phase balance measurement circuit 200 (e.g., on the same PCB), or it may be external to the zero-degree phase balance measurement circuit 200. The processor 220 may be configured to generate, as an output, a phase error correction value as a function of the first and second phase difference signals P1, P2. This phase error correction value may be used to enhance AOA accuracy of the zero-degree phase balance measurement circuit 200. An illustrative method that may be performed by the processor 220 will be described in further detail below in conjunction with FIG. 4.

Figure 3A:
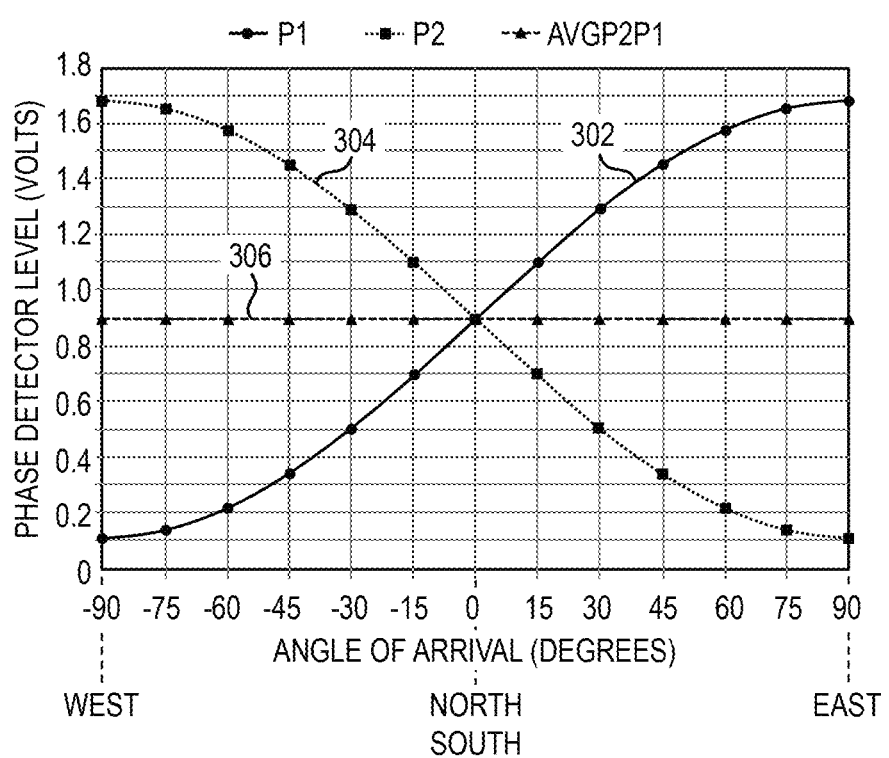
FIG. 3A is a graph showing theoretical phase normal and phase reversal waveforms generated as outputs of the first and second phase detectors, respectively, shown in FIG. 2 for the example scenario in which each of the first and second phase detectors is configured having an output voltage swing from about 0 to 1.8 V, according to embodiments of the inventive concept.

FIG. 3A is a graph showing a phase normal waveform 302 and a phase reversal waveform 304 generated as first and second phase difference signals P1 and P2 of the first phase detector 210 and second phase detector 212, respectively, for the example scenario described above wherein each of the first and second phase detectors 210, 212 is configured having an output voltage swing from about 0 to 1.8 V. Waveform 306 represents an average of the first and second phase detector outputs P1, P2. FIG. 3A illustrates an ideal (i.e., theoretical) case wherein the average of the first and second phase difference signals P1, P2 is exactly at the midpoint of 900 mV for all AOA values, and the zero phase balance point with the most accuracy (i.e., the point of intersection between the first and second phase difference signals P1, P2) occurs at an AOA of zero degrees.

Figure 3B:
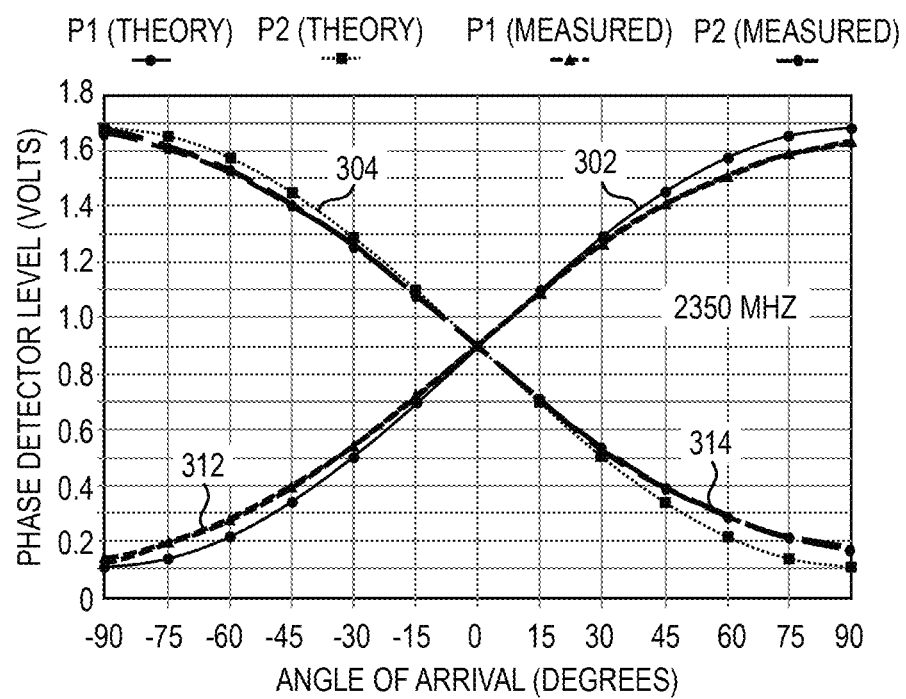
FIGS. 3B-3D are graphs depicting measured phase normal and measured phase reversal waveforms superimposed over the theoretical phase normal and phase reversal waveforms illustrated in FIG. 3A for various frequencies of the received RF signal, according to embodiments of the inventive concept.
Figure 3C:
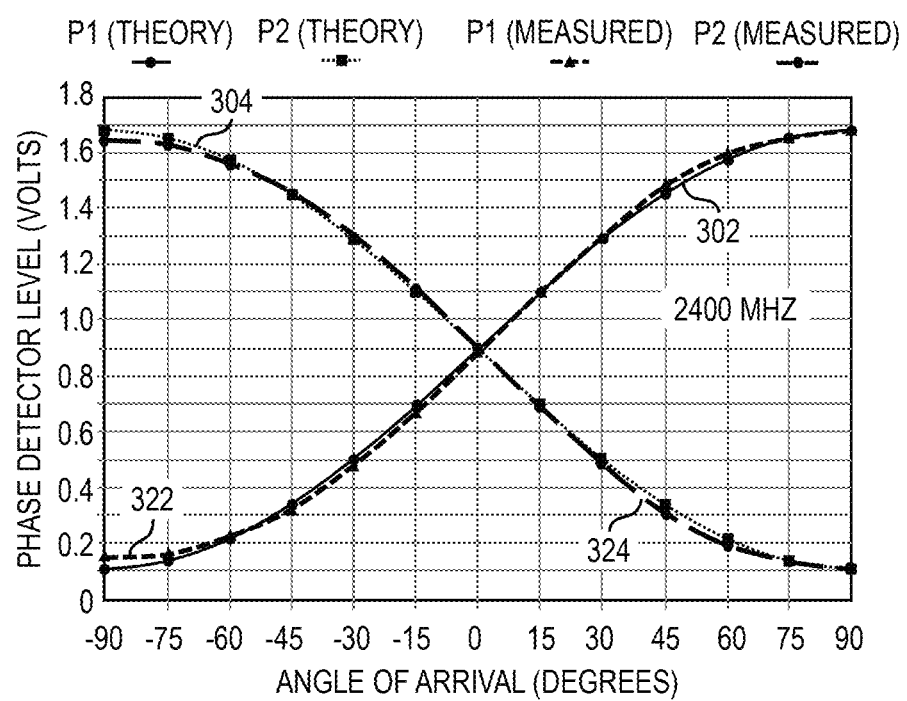
Figure 3D:
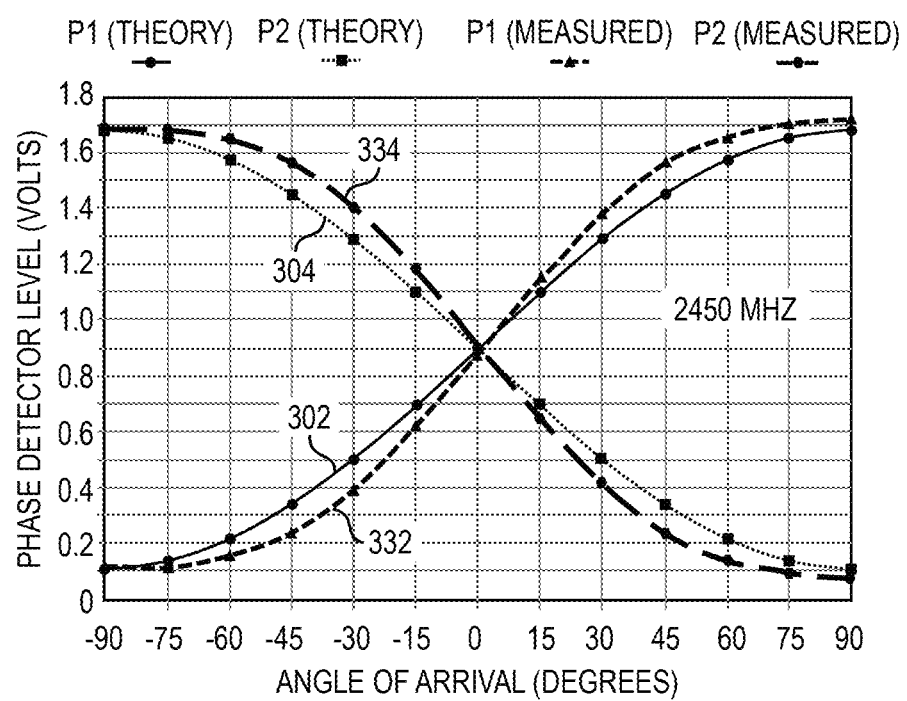

FIGS. 3B-3D are graphs showing measured phase normal waveform phase reversal waveforms superimposed over the theoretical phase normal and phase reversal waveforms depicted in FIG. 3A for various frequencies of the received RF signal, according to embodiments of the inventive concept. Referring to FIG. 3B, waveform 312 represents a measured first phase difference signal P1 generated by the first phase detector (210 in FIG. 2) and waveform 314 represents a measured second phase difference signal P2 generated by the second phase detector (212 in FIG. 2) for an incoming RF signal of 2350 MHz. As apparent from FIG. 3B, the measured first and second output signal waveforms 312, 314 closely track the theoretical first and second output signal waveforms 302, 304 particularly near an AOA of about zero degrees, and begin to exhibit increasing phase error as the AOA approaches ±90 degrees, with the largest phase error occurring at an AOA of about 15-75 degrees. Taking the average value of the initial phase detector measurements and subtracting this average value from the true zero reference provides a zero-balance error correction value that can be used to rebalance the initial phase measurements. FIG. 3B illustrates a decreasing phase slope where d<¼λ at 2350 MHz and agrees with theory, referring to equation (1), where Δϕ is proportional to changes in frequency.

Referring to FIG. 3C, waveform 322 represents a measured first phase difference signal P1 generated by the first phase detector (210 in FIG. 2) and waveform 324 represents a measured second output signal P2 generated by the second phase detector (212 in FIG. 2) for an incoming RF signal of 2400 MHZ. As apparent from FIG. 3C, the measured first and second output signal waveforms 322, 324 closely track the theoretical first and second output signal waveforms 302, 304 for nearly all values of AOA. The measured first and second output signal waveforms 322, 324 exhibit less phase error primarily because the spacing between the first and second antennas (206 and 208 in FIG. 2) is designed for a center frequency of 2400 MHz of the incoming RF signal (e.g., about 20 mm separation between the first and second antennas). The initial phase measurements can be rebalanced by taking the average value of the initial phase detector measurements and subtracting the average value from the true zero reference for each phase detector in order to obtain the zero-balance error correction value. The waveforms 322, 324 in FIG. 3C illustrate a close similarity with the theoretical waveforms 302, 304, indicating d=¼λ at 2400 MHz.

Referring to FIG. 3D, waveform 332 represents a measured first output signal P1 generated by the first phase detector (210 in FIG. 2) and waveform 334 represents a measured second phase difference signal P2 generated by the second phase detector (212 in FIG. 2) for an incoming RF signal of 2450 MHz. As apparent from FIG. 3D, the measured first and second output signal waveforms 332, 334 closely track the theoretical first and second output signal waveforms 302, 304 particularly near an AOA of about zero degrees, and begin to exhibit increasing phase error as the AOA approaches ±90 degrees, with the largest phase error occurring at an AOA of about 15-75 degrees. The measured first and second output signal waveforms 332, 334 may exhibit more phase error compared to the case shown in FIG. 3C where the incoming RF signal is 2400 MHz primarily because the spacing of 20 mm between the first and second antennas (206 and 208 in FIG. 2) is more closely matched to a center frequency of 2400 MHz of the incoming RF signal, as stated above. Again, taking the average value of the initial phase detector measurements and subtracting this average value from the true zero reference provides a zero-balance error correction value that can be used to rebalance the initial phase measurements. FIG. 3D illustrates an increasing phase slope where d>¼λ at 2450 MHz and agrees with theory, referring to equation (1) above, where Δϕ is proportional to changes in frequency.

With regard to design of the spacing between the first and second antennas for a given center frequency, $f_C$, of the incoming RF signal, the following expression can be used to relate frequency and wavelength:

$$\lambda = c/f_C \quad (3)$$

where C is the speed of light in a vacuum (i.e., about $3 \times 10^8$ m/s). For a center frequency of 2400 MHz, a quarter-wavelength spacing should ideally be about 31.25 mm, using equation (3) above. However, when using antennas formed on a printed circuit board (PCB), as is common at gigahertz frequencies, where the signal transmission medium is not a vacuum but rather may be degraded by factors such as PCB copper traces, PCB dielectric material, etc., the quarter-wavelength spacing for producing a 90-degree phase shift between the two antennas will be closer to about 20 mm (i.e., about 0.8 inch).

The normal and reverse measurement of phase slopes shown in the example graph of FIG. 3A illustrates the ideal zero-crossing phase measurements taken by separate phase detectors (210, 212 in FIG. 2). The theoretical waveforms 302, 304 shown in FIG. 3A were derived in the following manner: phase detector level (volts)=0.8·(sin(θ)+1)+0.1, where θ=AOA. This combination of components enables balanced measurements to aid in the zero-degree phase balance measurements and, more importantly, correcting the zero-degree phase balance especially near the boresight (i.e., broadside) where AOA is zero degrees. Phase balancing is most important near zero boresight azimuth angles where AOA is essentially insensitive to elevation angle (α in equation (1)) and where the azimuth angle will be most accurate.

FIG. 4 is a flow chart depicting illustrative steps in an example method 400 for performing a zero-degree phase balance calculation, according to one or more embodiments of the inventive concept. In one or more embodiments, the method 400 (or portions thereof) may be performed by the processor 220 shown in FIG. 2, which may be integrated with the zero-degree phase balance measurement circuit 200. In other embodiments, the method 400 (or portions thereof) may alternatively, or in addition to, be performed by an external processing device (e.g., storage oscilloscope, computer, etc.). The method 400 assumes that each of the phase detectors 210, 212 of FIG. 2 are configured having an output voltage swing of about 0 to 1.8 V, although embodiments are not limited thereto.

Referring to FIG. 4, the method 400 includes initially measuring output voltages, $V_{P1}$ and $V_{P2}$, corresponding to the first and second phase difference signals P1 and P2, respectively, generated by the first and second phase detectors (210, 212 in FIG. 2) in step 402. An average phase value, $V_{PAVG}$, of the initial phase detector measurements $V_{P1}$ and $V_{P2}$ is then determined in step 404. The average phase value $V_{PAVG}$ can be calculated by adding the two initial phase detector measurements $V_{P1}$ and $V_{P2}$ and dividing by two $$\left(\text{i.e., } V_{PAVG} = \frac{V_{P1} + V_{P2}}{2}\right).$$

In step 406, an error correction value, C, may be determined by subtracting the average phase value $V_{PAVG}$ from the ideal output voltage $V_{ZERO}$ of the phase detector when the phase difference between the input signals is zero (i.e., $V_{ZERO}$); that is, $C=(V_{ZERO}-V_{PAVG})$. The ideal output voltage $V_{ZERO}$ of the phase detector when the phase difference between the input signals is zero may be defined as a midpoint of the output voltage swing of the phase detectors. In the example scenario described above, where each phase detector is configured having an output voltage swing of 0 to 1.8 V, the output voltage of a given phase detector when the input phase difference is zero will be the midpoint of the output voltage swing of the phase detector, ideally 900 mV in this example.

Corrected first and second measured output phase voltages, $V_{P1}'$ and $V_{P2}'$, may be determined in step 408 based on the calculated error correction value C. Specifically, the corrected first measured output phase voltage $V_{P1}'$ of the first phase detector (210 in FIG. 2) can be calculated by adding the error correction value C to the initial phase detector measurement $V_{P1}$ (i.e., $V_{P1}'=V_{P1}+C$). Similarly, the corrected second measured output phase voltage $V_{P2}'$ of the second phase detector (212 in FIG. 2) can be calculated by adding the error correction value C to the initial phase detector measurement $V_{P2}$ (i.e., $V_{P2}'=V_{P2}+C$).

In step 410, a final phase value for each of the first and second measured phase voltages $V_{P1}$ and $V_{P2}$ is determined. Specifically, when the corrected first measured output phase voltage $V_{P1}'$ of the first phase detector is greater than 900 mV (i.e., midpoint of the phase detector), the final phase value, $V_{P1(+)}$, for the first measured output phase voltage $V_{P1}$ is determined by subtracting 900 from the corrected first measured output phase voltage $V_{P1}'$ (i.e., $V_{P1(+)}=V_{P1}'-900$). When the corrected first measured output phase voltage $V_{P1}'$ of the first phase detector is less than or equal to 900 mV, the final phase value, $V_{P1(-)}$, for the first measured output phase voltage $V_{P1}$ is determined by subtracting 900 from the corrected first measured output phase voltage $V_{P1}'$ (i.e., $V_{P1(-)}=V_{P1}'-900$). Similarly, when the corrected second measured output phase voltage $V_{P2}'$ of the second phase detector is greater than 900 mV, the final phase value, $V_{P2(+)}$, for the second measured output phase voltage $V_{P2}$ is determined by subtracting 900 from the corrected second measured output phase voltage $V_{P2}'$ (i.e., $V_{P2(+)}=V_{P2}'-900$). When the corrected second measured output phase voltage $V_{P1}'$ of the second phase detector is less than or equal to 900 mV, the final phase value, $V_{P2(-)}$, for the second measured output phase voltage $V_{P2}$ is determined by subtracting 900 from the corrected second measured output phase voltage $V_{P2}'$ (i.e., $V_{P2(-)}=V_{P2}'-900$). For each of the corrected $V_{P(+)}$ and $V_{P(-)}$ values given in mV, divide the mV value by 10 and this will convert the voltages to electrical phase units with polarity±degrees.

Figure 5A:
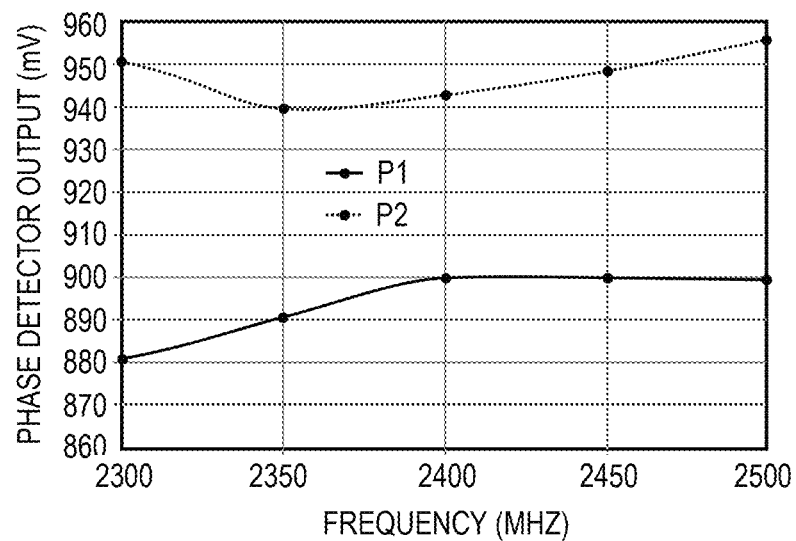
FIGS. 5A and 5B are graphs depicting initial first and second phase difference signals P1 and P2 before and after applying frequency-based phase offsets to obtain zero-balanced phase difference signals over a frequency band of 2300 MHz to 2500 MHZ, according to embodiments of the inventive concept.
Figure 5B:
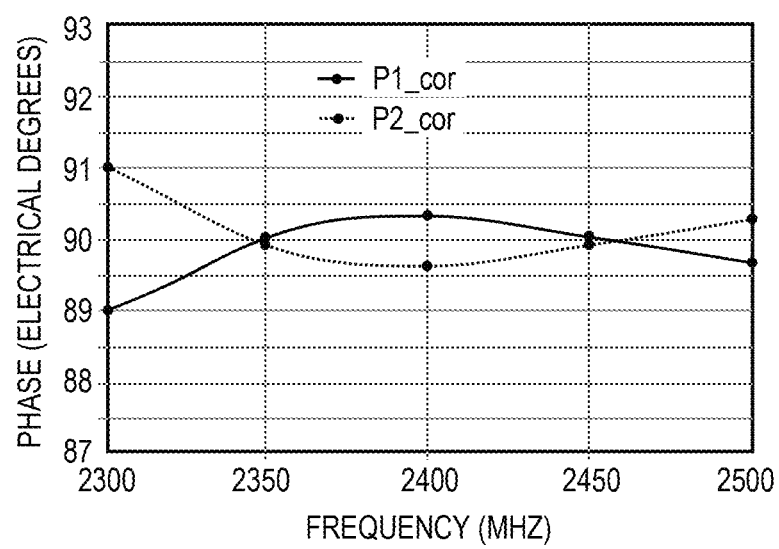

In step 412, first and second phase difference signals P1 and P2 are measured at zero degrees across the frequency band of interest and, using the method 400, any phase offsets at specific frequencies are applied as deemed necessary. By way of example only and without limitation, FIGS. 5A and 5B are graphs depicting the initial first and second phase difference signals P1 and P2 before and after applying frequency-based phase offsets to obtain zero-balanced phase difference signals over a frequency band of 2300 MHz to 2500 MHZ, according to embodiments of the inventive concept. Referring to FIG. 5A, initial first and second phase difference signals P1 and P2 as shown. As apparent from FIG. 5B, after performing the zero balance method 400 described in connection with FIG. 4, the resulting corrected first and second phase difference signals P1_cor and P2_cor will have less than one degree of phase error over the selected frequency band of 2300 MHz-2500 MHZ, thereby providing enhanced accuracy of AOA estimates.

Figure 6:
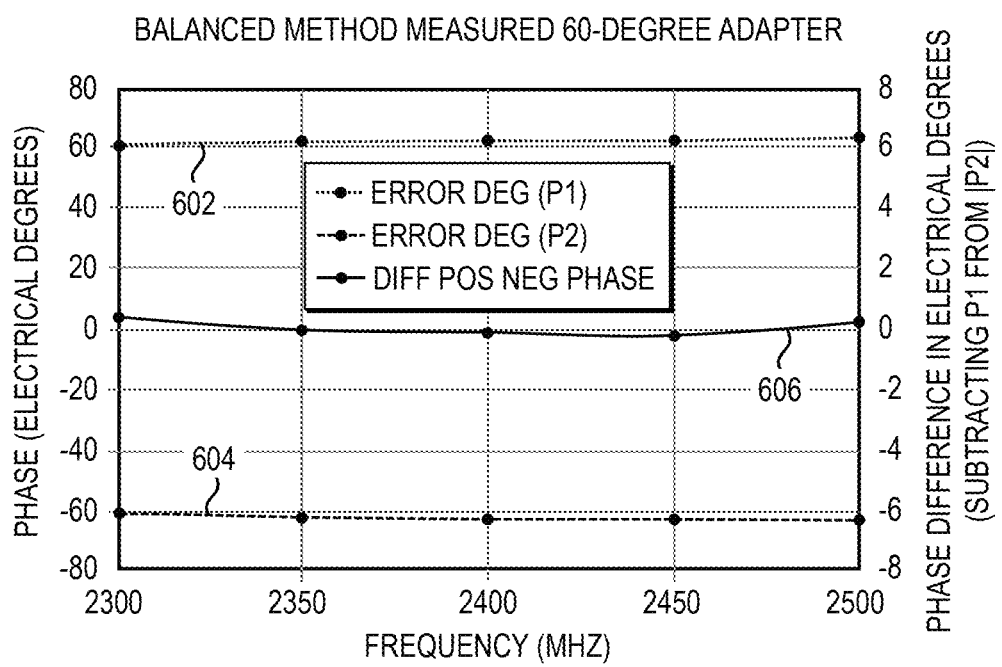
FIG. 6 is a graph depicting the zero balance method performance measured at zero degrees and at 60 degrees using a fixed delay line test methodology, according to embodiments of the inventive concept.

$V_{P1(+)}$ or $V_{P2(-)}$ phase slope may be used after performing the zero balance method (e.g., method 400 shown in FIG. 4) to provide AOA estimates at zero-degree boresight as well as to end-fire±90 degrees. By way of example only and without limitation, FIG. 6 is a graph depicting the zero balance method performance measured at 60 degrees using a fixed delay line test methodology, according to embodiments of the inventive concept. Referring to FIG. 6, plot 602 represents error degrees for the positive slope first final phase value $V_{P1(+)}$ associated with the first phase detector (210 in FIG. 2), plot 604 represents error degrees for the negative slope second final phase value $V_{P2(-)}$ associated with the second phase detector, (212 in FIG. 2), and plot 606 represents a phase difference between the two phase slopes determined by subtracting plot 602 from the absolute value of plot 604 (i.e., $|V_{P2(-)}|-V_{P1(+)}$. It is apparent from FIG. 6 that plot 602 exhibits a slightly increasing phase slope from 2300 to 2500 MHZ, which agrees with theory and equation (1); increasing frequency results in increasing phase for the fixed 60 electrical degrees component.

In one or more embodiments, the first and second antennas 206, 208 used in conjunction with the illustrative zero-phase balance measurement circuit 200 shown in FIG. 2 may be implemented on a substrate (e.g., PCB). In one or more embodiments, each of the first and second antennas 206, 208 may comprise a planar sleeve dipole antenna. The substrate on which the antennas are formed may comprise, for example, FR4 material, which is a National Electrical Manufacturers Association (NEMA) grade designation for a composite material composed of woven fiberglass cloth with an epoxy resin binder. Radiating elements of the antennas may be formed as conductive traces on a PCB. In one or more embodiments, the sleeve dipole antennas may be integrated with at least a portion of the components of the zero-phase balance measurement circuit 200 shown in FIG. 2 (e.g., hybrid couplers and phase detectors) on the same PCB. In other embodiments, the components of the zero-phase balance measurement circuit may be formed on a first PCB and the sleeve dipole antennas may be formed on a second PCB detachable from the first PCB. In this manner, the zero-phase balance measurement circuit on the first PCB may be configured to operate in different frequency bands by swapping out the second PCB with antennas having a different length and/or spacing design for the frequency band of interest. The antennas may be electrically coupled to the hybrid couplers using, for example, a coaxial cable or other connection means. The antennas may be separate sleeve dipoles.

Figure 7A:
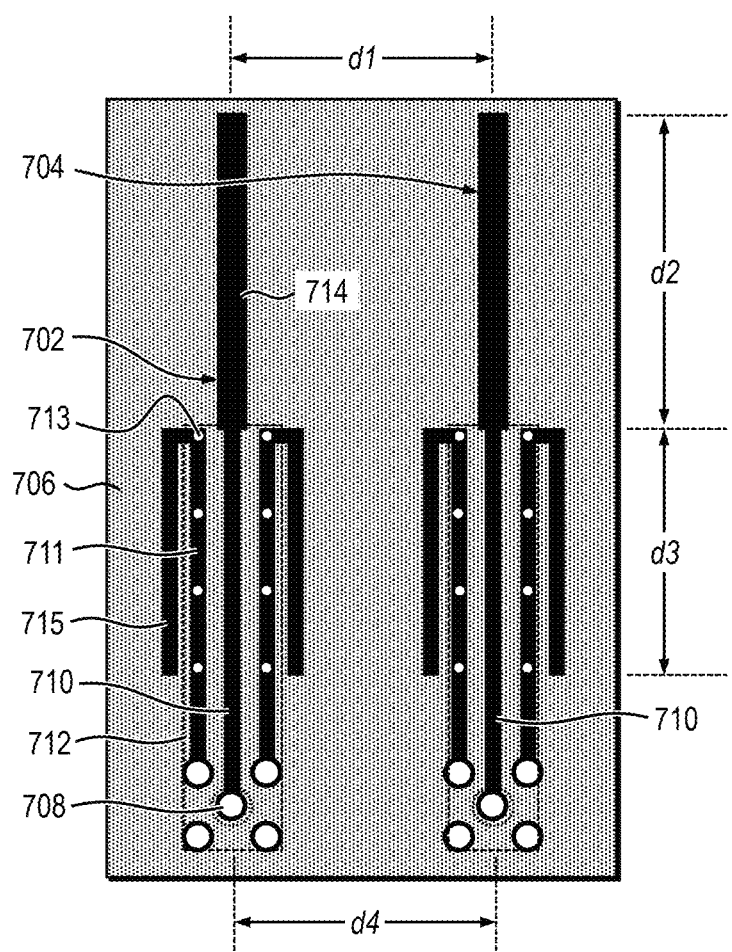
FIG. 7A is a schematic top plan layout view depicting a pair of planar sleeve dipole antennas configured for use with the zero-phase balance measurement circuit according to one or more embodiments of the inventive concept.

By way of example only and without limitation, FIG. 7A is a schematic top plan view depicting a pair of planar sleeve dipole antennas configured for use with the zero-phase balance measurement circuit according to one or more embodiments. Referring to FIG. 7A, a first planar sleeve dipole antenna 702 and a second planar sleeve dipole antenna 704 are formed on a substrate 706. In one or more embodiments, the substrate 706 may comprise an FR4 PCB, although embodiments are not limited thereto. Each of the antennas 702, 704 includes an input port 708 which is coupled to a feedline 710 which may designed as a coplanar waveguide interface to antennas 702 and 704.

In one or more embodiments, the substrate (PCB) 706 may comprise a four-layer FR4 material with four copper layers used as respective top and bottom trace layers and inner ground and power layers. The power layer and bottom trace copper layers are not used so copper is removed from these layers in FIG. 7A. The top trace layer is used for the first and second planar sleeve dipole antennas 702, 704 and a coplanar section trace as the feedline 710, and for implementing an internal ground layer 712 with supporting ground guide 711 along each side of the feedline 710. The ground layer 712 is directly beneath the feedline 710 and supporting ground guide 711. The supporting ground guide 711 on either side of the feedline 710 for each of the antennas 702, 704 may be electrically connected to the ground layer 712 using a plurality of conductive vias 713. This method of grounding contains the RF signals inside the region of the feedline 710 within the boundary of the coplanar waveguide formed by the supporting ground layer 712, supporting ground guide 711 and conducting ground vias 713.

Each of the antennas 702, 704 further includes a dipole radiating element 714 and sleeve elements 715 on opposing sides of the radiating element 714. A top portion (e.g., top half) of the radiating element 714 of each of the planar sleeve dipole antennas 702, 704 captures vertically polarized incident wave field currents, and the sleeve elements 715 complete a lower half of the planar sleeve dipole antennas 702, 704 and provide a counterpoise which eliminates external ground plane dependence.

In one or more embodiments, a spacing, d1, between the first and second antennas 702, 704 may be configured to be D, where D is a distance of about one-quarter wavelength (¼λ) for providing a 90-degree phase shift between the two antennas 702, 704. Taking into account the transmission medium (e.g., PCB 706 and conductive traces), the quarter-wavelength spacing D for producing a 90-degree phase shift between the two antennas 702, 704 will be about 20 mm for a center frequency of 2400 MHz in the desired frequency band of operation. A length, d2, of the dipole radiating element 714, a length, d3, of the dipole sleeve element 715, and a spacing, d4, between the input ports 708 of the first and second antennas 702, 704 may also be equal to D, or about 20 mm in this example.

Figure 7B:
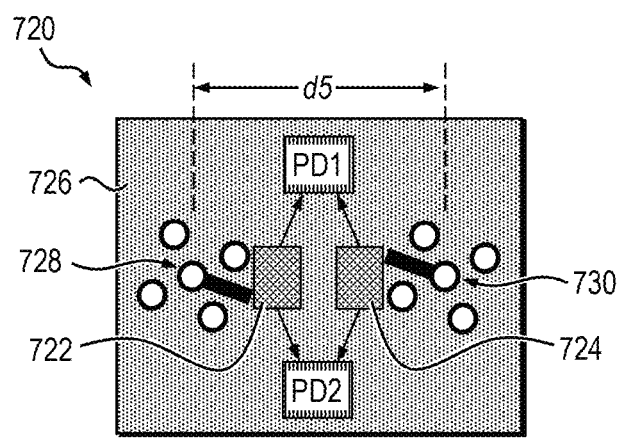
FIG. 7B is a schematic top plan layout view depicting an illustrative zero-phase balance measurement circuit on a printed circuit board (PCB), according to one or more embodiments of the inventive concept.

FIG. 7B is a schematic PCB layout top plan view depicting an illustrative zero-phase balance measurement circuit 720, according to one or more embodiments. The zero-phase balance measurement circuit 720 may be implemented in a manner consistent with the example zero-phase balance measurement circuit 200 shown in FIG. 2. Referring to FIG. 7B, the zero-phase balance measurement circuit 720 includes a first hybrid coupler 722, a second hybrid coupler 724, a first phase detector PD1 and a second phase detector PD2 provided on a substrate 726, which may be an FR4 PCB. The zero-phase balance measurement circuit 720 further includes a first input connector 728 coupled to an input port of the first hybrid coupler 722 and a second input connector 730 coupled to an input port of the second hybrid coupler 724. In this example, a spacing, d5, between the first and second connectors 728, 730 of the zero-phase balance measurement circuit 720 is configured to be the same as the spacing d1 between the first and second antennas 702, 704 shown in FIG. 7A, which in this example is configured to be D=20 mm for a center frequency of 2400 MHZ.

In test simulations of the zero-phase balance measurement circuit 720 coupled to the pair of planar sleeve dipole antennas 702, 704 shown in FIG. 7A, voltage standing wave ratio (VSWR) measurements were better than 2:1. Mutual coupling mitigation is achieved with good VSWR and good antenna separation isolation. Greater than about 20 dB combined return loss (dB) and antenna isolation (dB) between the separated antennas is a good rule of thumb. The calculated phase error for 20 dB=0.01×57.3 or 0.573 degrees and is a good estimate for this small angular error. Using equation (3) above, this will translate to an AOA equivalent error of 0.573×2/π=±0.365 degrees.

Figure 8:
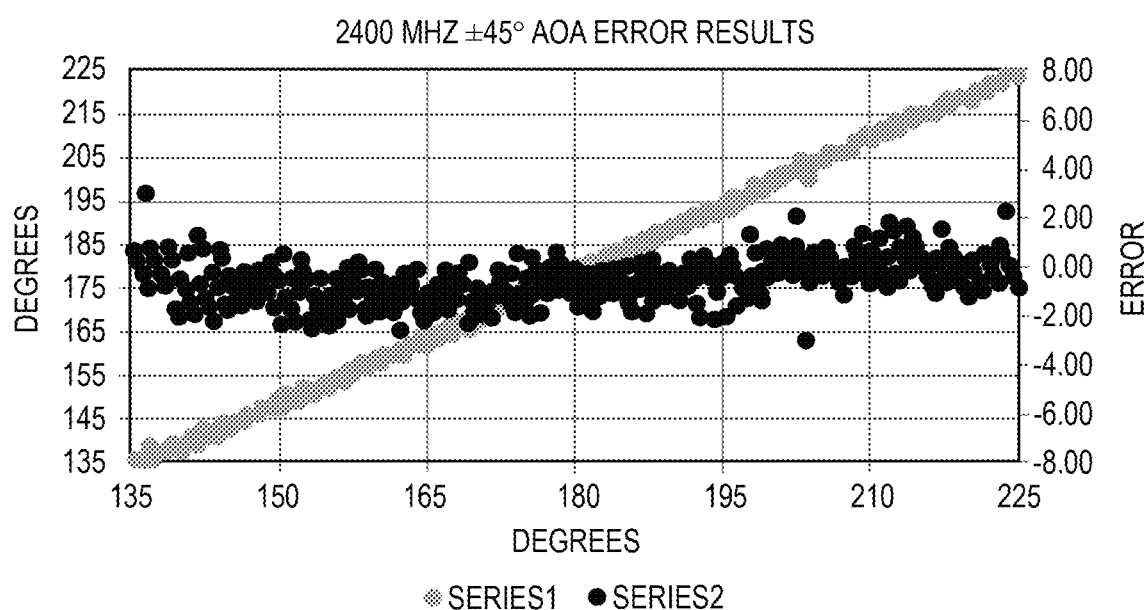
FIG. 8 is a graph depicting turntable performance of the zero-phase balance measurement circuit and planar sleeve dipole antenna arrangement shown in FIGS. 7A and 7B at a frequency of 2400 MHZ, according to one or more embodiments of the inventive concept.

The example planar sleeve dipole antenna arrangement shown in FIG. 7A was tested on a rotating platform (i.e., turntable) that achieved results as shown in FIGS. 3B-3D, which illustrates performance for ±90 degrees at a center frequency of 2350 MHZ, 2400 MHZ, and 2450 MHZ, respectively. As shown in FIG. 8, performance of the zero-phase balance measurement circuit 720 and planar sleeve dipole antenna arrangement 702, 704 (see FIGS. 7A and 7B) at a frequency of 2400 MHz was characterized by an AOA (standard deviation) accuracy on the order of about ±1 degree (Series2 plot). The performance illustrates a peak-to-peak error performance which includes manual testing of the phase error, referring to FIG. 5B, and also includes the effects of mutual coupling and provides a validation that the total AOA performance is good over the AOA region shown in FIG. 8. In addition, the overall phase error can be computed using equation (3) above where: dφ error=±π/2 degree phase for a ±1 degree AOA accuracy. When operating over a wide frequency range and to obtain an optimal curve fit, individual scale factors can be applied using the zero-phase balance measurement circuit in conjunction with an instantaneous frequency measurement (IFM) circuit, as will be described in further detail herein below. The Series1 plot in FIG. 8 describes actual AOA measured degrees (y-axis) versus turntable AOA degrees (x-axis).

Figure 9:
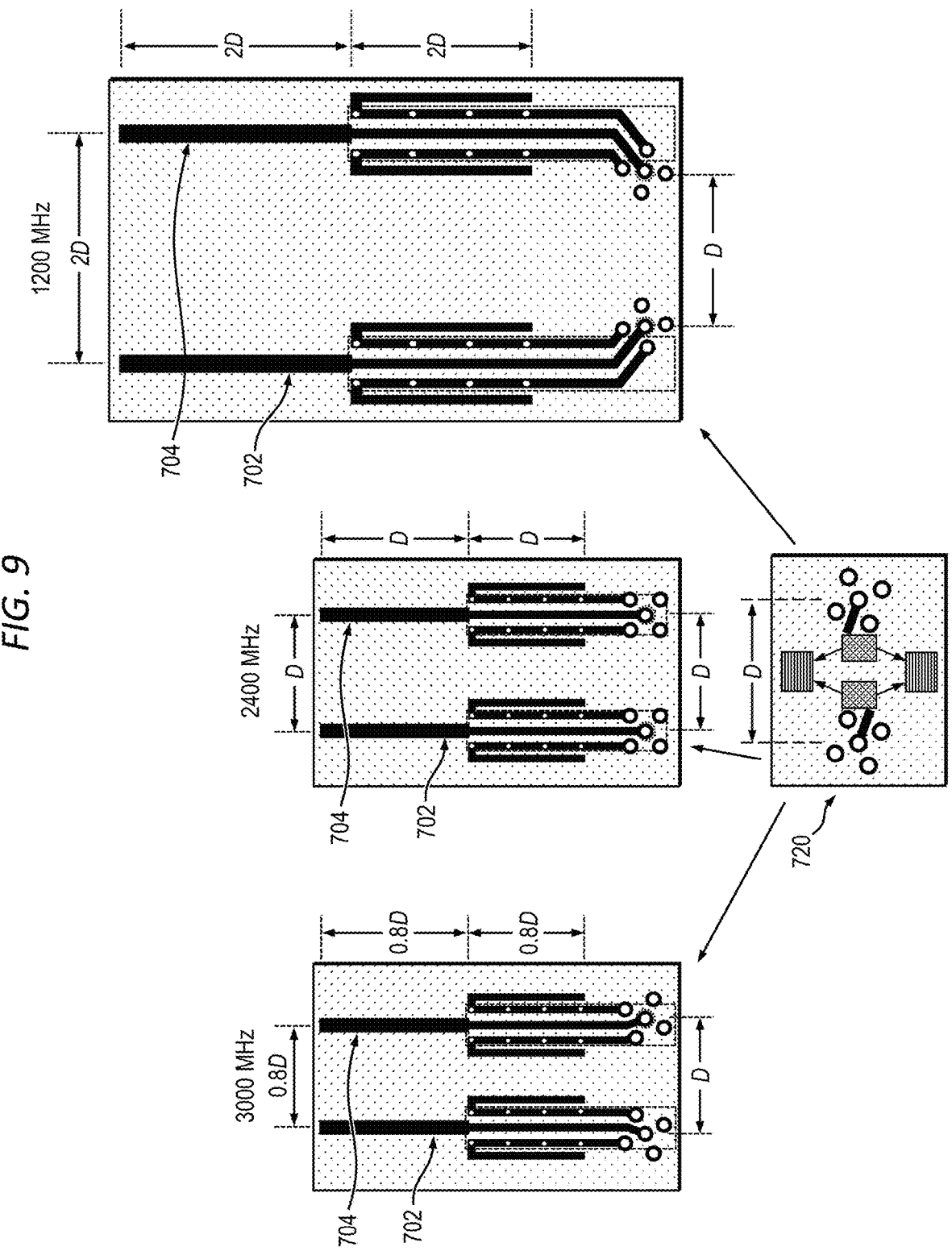
FIG. 9 are schematic top plan layout view conceptually depicting how different planar sleeve dipole antenna arrangements can be scaled for use with the zero-balance phase measurement circuit at different frequencies of operation, according to embodiments of the inventive concept.

As previously stated, by using an antenna arrangement that is detachable from the remainder of the zero-phase balance measurement circuit, the zero-phase balance measurement circuit can be easily configured for use at different frequencies by swapping the antenna PCB with a different antenna PCB configured for a new frequency of operation. For example, a notional scaling of the antenna spacing and dimensions of the planar sleeve dipole antennas for three different frequencies of operation—3000 MHZ, 2400 MHz and 1200 MHZ—is shown in FIG. 9, according to embodiments of the inventive concept. Referring to FIG. 9, at a frequency of 3000 MHz, the spacing between the first and second planar sleeve dipole antennas 702, 704 may be configured to be 0.8D=16 mm. At a frequency of 1200 MHZ, the spacing between the first and second planar sleeve dipole antennas 702, 704 may be configured to be 2D=40 mm. Compared this with a spacing of D=20 mm between the first and second planar sleeve dipole antennas 702, 704 at a frequency of 2400 MHZ.

The spacing between the connectors on the zero-phase balance measurement circuit PCB 720 may remain at D=20 mm, and the hybrid couplers may be swapped out with different hybrid couplers designed for the particular frequency of operation. Furthermore, circuit components (e.g., circuit cards) with equivalent connectivity spacing (e.g., 20 mm) may be optionally inserted between the antennas 702, 704 and the zero-phase balance measurement circuit 720 for increasing sensitivity, such as, for example, frequency band filters and amplification circuitry. It is to be appreciated that the filtering and amplification circuitry can be placed anywhere in the signal path between the antennas and the phase detectors. For example, rather than placing the filters between the antennas and the hybrid couplers, the filters may be coupled between the outputs of the hybrid couplers and the inputs to the phase detectors.

Figure 10:
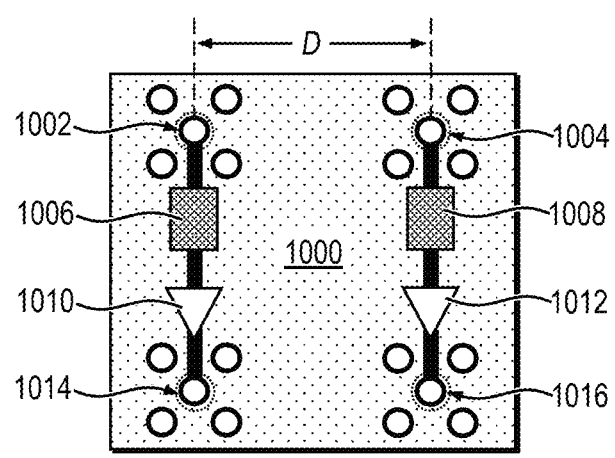
FIG. 10 is a schematic top plan layout view depicting a PCB suitable for use in conjunction with the zero-phase balance measurement circuit for increasing sensitivity, according to embodiments of the inventive concept.

By way of illustration only and without limitation, FIG. 10 is a schematic top plan layout view depicting a PCB 1000 suitable for use in conjunction with the zero-phase balance measurement circuit for increasing sensitivity, according to embodiments of the inventive concept. The PCB 1000 includes first and second input connectors 1002 and 1004, respectively, having a spacing of D=20 mm, in this example. A center terminal of the first input connector 1002 is coupled to an input of a first filter 1006, and a center terminal of the second input connector 1004 is coupled to an input of a second filter 1008. Each of the first and second filters 1006, 1008 may be configured to attenuate signals outside of a frequency band of operation. An output of the first filter 1006 is coupled to an input of a first amplifier 1010, and an output of the second filter 1008 is coupled to an input of a second amplifier 1012. Each of the first and second amplifiers 1010, 1012 may be configured to amplify signals in the corresponding signal paths and to generate an amplified output signal. The amplified output signal from the first amplifier 1010 may be provided to a center terminal of a first output connector 1014, and the amplified output signal from the second amplifier 1012 may be provided to a center terminal of a second output connector 1016. The first and second antennas 702, 704 may be coupled to the first and second input connectors 1002, 1004, respectively, and the first and second hybrid couplers 202, 204 (see FIG. 2) may be coupled to the first and second output connectors 1014, 1016, respectively.

Figure 11:
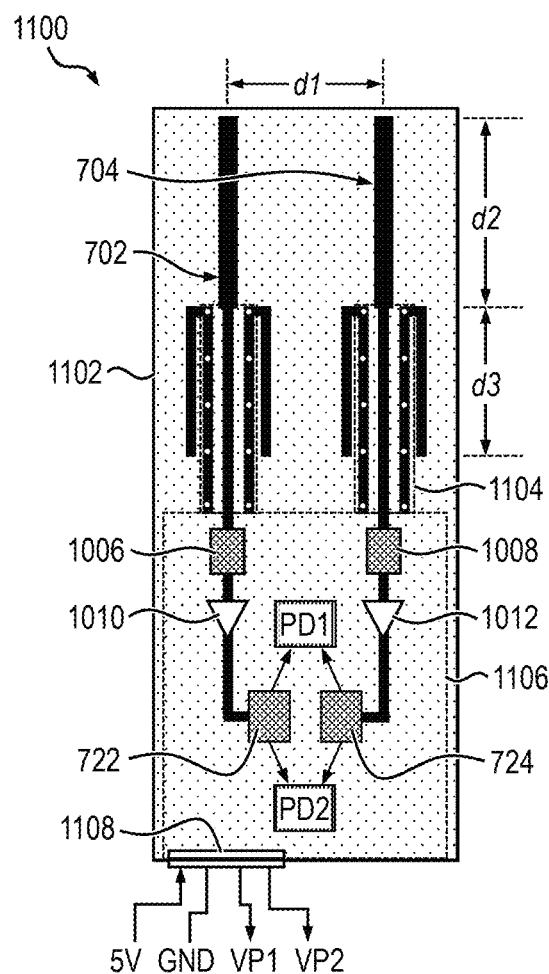
FIG. 11 is a schematic top plan layout view depicting an illustrative zero-phase balance measurement circuit integrated with twin planar sleeve dipole antennas and frequency band filters and amplification circuitry for enhancing sensitivity of the zero-phase balance measurement circuit, according to one or more embodiments of the inventive concept.

FIG. 11 is a schematic top plan layout view depicting an illustrative zero-phase balance measurement circuit 1100 integrated with twin planar sleeve dipole antennas and frequency band filters and amplification circuitry for enhancing sensitivity of the zero-phase balance measurement circuit, according to one or more embodiments of the inventive concept. Referring to FIG. 11, the zero-phase balance measurement circuit 1100 includes first and second planar sleeve dipole antennas 702, 704, described in detail in conjunction with FIG. 7, formed on a PCB 1102, which may be an FR4 PCB. The PCB 1102 may include a first internal layer ground plane 1104 disposed beneath each coplanar waveguide trace (i.e., feedline) 710 of the first and second antennas 702, 704. A feedline of each of the first and second antennas 702, 704 may be coupled to the respective inputs of the first and second filters 1006, 1008. The filtered output signals generated by the first and second filters 1006, 1008 are provided to the respective inputs of the first and second amplifiers 1010, 1012.

The amplified output signals generated by the first and second amplifiers 1010, 1012 are provided to respective inputs of the first and second hybrid couplers 722, 724. The zero-degree output of the first hybrid coupler 722 and the 90-degree output of the second hybrid coupler 724 are provided to first and second inputs of the first phase detector PD1, and the 90-degree output of the first hybrid coupler 722 and the zero-degree output of the second hybrid coupler 724 are provided to first and second inputs of the second phase detector PD2. The first and second filters 1006, 1008, the first and second amplifiers 1010, 1012, the first and second hybrid couplers 722, 724 and the first and second phase detectors PD1, PD2 may be integrated together with the first and second planar sleeve dipole antennas 702, 704 on the same PCB 1102 in this illustrative embodiment. In one or more embodiments, the size of the PCB 1102 may be smaller than a standard credit card (e.g., less than about 54 mm in width and 85 mm in length), which makes the overall zero-phase balance measurement circuit suitable for use in a wearable RDF system, among other beneficial applications.

In embodiments in which filtering and/or amplification is not required, the filters 1006, 1008 and/or amplifiers 1010, 1012 may be omitted and replaced with respective jumper wires (i.e., electrical short circuits). In other embodiments, the placement of the filters 1006, 1008 and/or amplifiers 1010, 1012 in the RF signal path for each antenna 702, 704 may be modified. For example, the filters 1006, 1008 and/or amplifiers 1010, 1012 may be provided between the outputs of the hybrid couplers 722, 724 and the inputs of the phase detectors PD1, PD2, as will become apparent to those skilled in the art given the teachings herein.

For applications in which RF signals require ambiguity resolution beyond what is otherwise achievable using a single two-antenna array, a zero-balance phase measurement system employing two or more two-antenna arrays according to embodiments of the inventive concept may be employed. By way of example only and without limitation, FIGS. 12A-12C are conceptual top plan views depicting illustrative zero-balance phase measurement systems employing two or more two-antenna arrays for improving AOA accuracy, according to embodiments of the inventive concept.

Figure 12A:
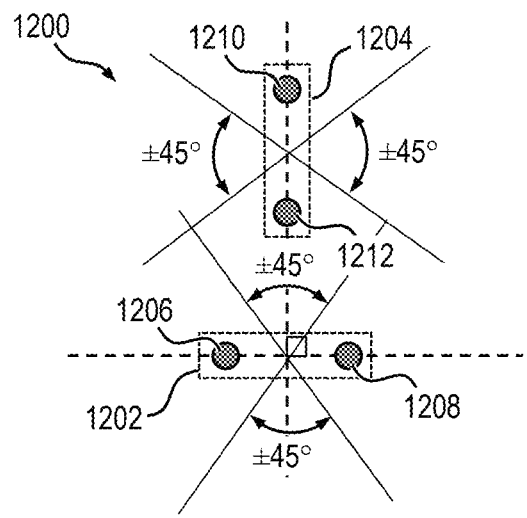
FIGS. 12A-12C are conceptual top plan views depicting illustrative zero-balance phase measurement systems employing two or more two-antenna arrays for improving AOA accuracy, according to embodiments of the inventive concept.

Referring to FIG. 12A, an orthogonal direction finding antenna array 1200 includes a first two-antenna array 1202 and a second two-antenna array 1204 oriented orthogonal (i.e., perpendicular) to the first two-antenna array 1202. The first two-antenna array 1202 includes first and second antennas 1206 and 1208, respectively, which are spaced one-quarter wavelength apart so as to generate a 90-degree phase difference between signals received at the first and second antennas 1206, 1208. Similarly, the second two-antenna array 1204 includes first and second antennas 1210 and 1212, respectively, which are spaced one-quarter wavelength apart so as to generate a 90-degree phase difference between signal received at the first and second antennas 1210, 1212. The first two-antenna array 1202 will primarily be used with accurate results as illustrated in FIG. 8 for coverage of north and south AOA 315 to 45 degrees and 135 to 225 degrees, respectively. The second two-antenna array 1204 will primarily be used with accurate results also as illustrated in FIG. 8 but, due to the orthogonal relation of the second two-antenna array 1204 relative to the first two-antenna array 1202, it will primarily be used with accurate results for coverage of the west and east AOA 225 to 315 degrees and 45 to 135 degrees, respectively. A notional placement of the two-antenna arrays 1202 and 1204 may be configured to be a far enough distance apart so they do not couple or interfere with one another.

Figure 12B:
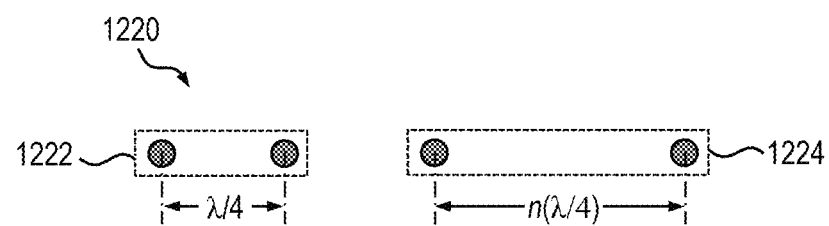

Referring to FIG. 12B, a linear direction finding antenna array 1220 includes a first two-antenna array 1222 including first and second antennas spaced one-quarter wavelength apart, and a second two-antenna array 1224 including first and second antennas spaced a multiple of n quarter wavelengths apart, where n is an integer greater than one. Each of the first and second antenna arrays 1222, 1224 is configured to produce a 90-degree phase shift between signal received at the first and second antennas therein. The first antenna array 1222 provides an unambiguous end-fire phase measurement where d≤¼λ. The first antenna array 1222 resolves the phase ambiguity of the second antenna array 1224 where d>¼λ and where a greater AOA accuracy is provided by incorporating a larger separation distance d.

Figure 12C:
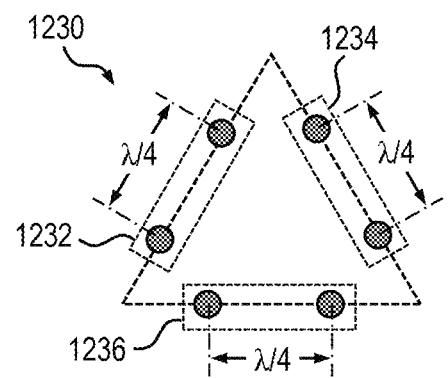

Referring to FIG. 12C, a triangular direction finding antenna array 1230 includes a first two-antenna array 1232, a second two-antenna array 1234, and a third two-antenna array 1236. The first, second and third antenna arrays 1232, 1234, 1236 may be arranged along sides of an equilateral triangle such that adjacent antenna arrays are oriented at an angle of 60 degrees relative to one another. Each of the first, second and third antenna arrays 1232, 1234, 1236 includes two antennas that are linearly spaced apart from one another by about one-quarter wavelength (i.e., ¼λ) and produce relative phase responses of P120 (+120 degrees), P0 (zero degrees) and P−120 (−120 degrees), respectively, based upon the AOA of the signal. The three phase responses can be further rebalanced in a similar fashion of averaging and applying a correction value found by subtracting the average from the actual zero value (900 mV) and adding the correction value to the initial P120, P0 and P−120 phases.

Figure 13A:
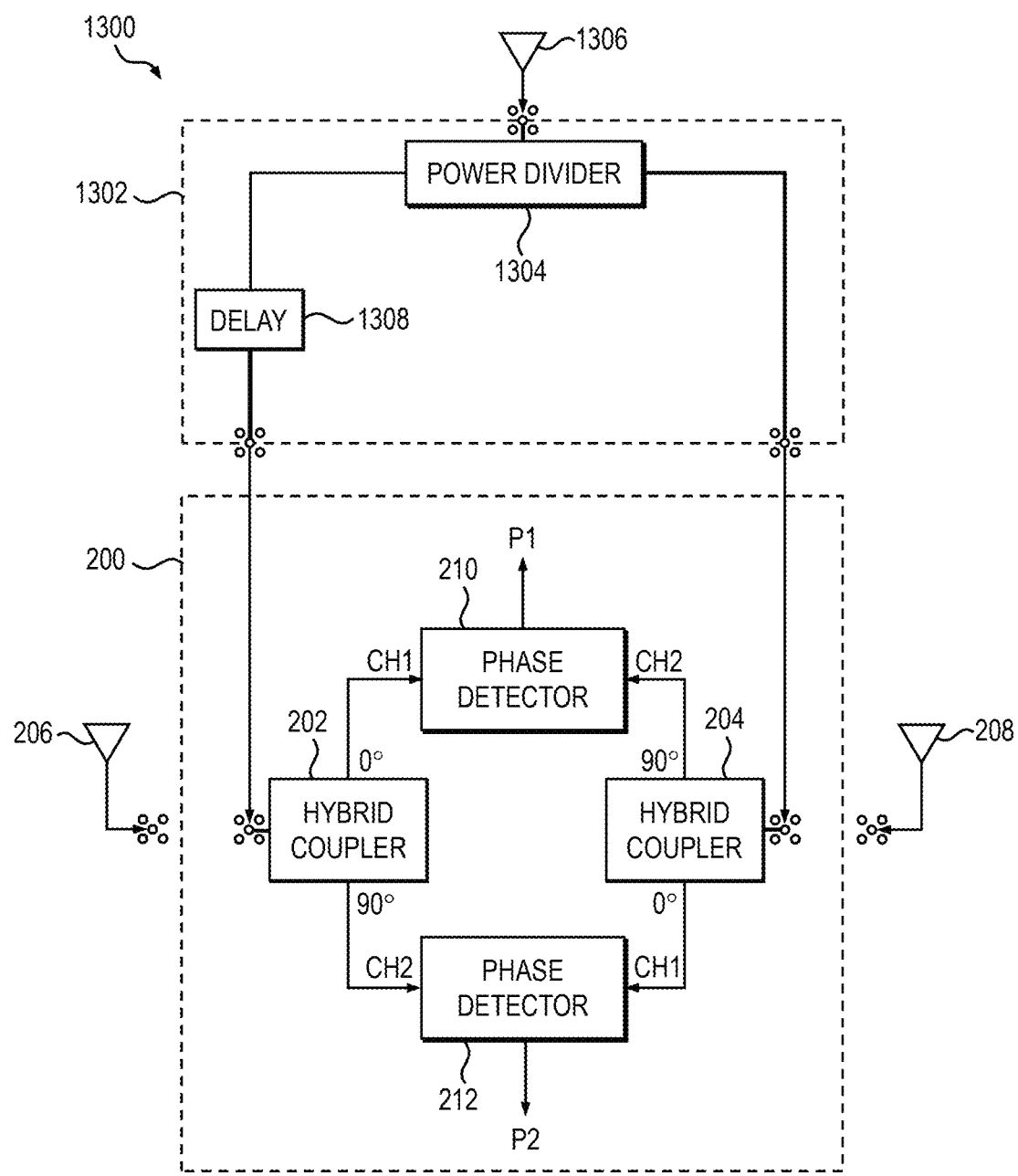
FIG. 13A is a schematic block diagram depicting an illustrative instantaneous frequency measurement (IFM) circuit, according to one or more embodiments of the inventive concept.

The zero-balance phase measurement circuit according to embodiments of the invention has many practical applications in addition to radio direction finding. For example, the zero-balance phase measurement circuit can be used in an instantaneous frequency measurement (IFM) application, according to one or more embodiments. FIG. 13A is a schematic diagram depicting an illustrative IFM circuit 1300, according to one or more embodiments of the inventive concept. Referring to FIG. 13A, the IFM circuit 1300 includes a signal generator circuit 1302 coupled to a zero-balance phase measurement 200 (previously described in conjunction with FIG. 2). By removing the first and second antennas 206, 208 used for radio direction finding and coupling the signal generator circuit 1302 to the inputs of the respective hybrid couplers 202, 204, the IFM circuit provides AOA accuracy across the operating frequency band. It does this by calculating AOA using equation (2) above with adjusted scaling factors to improve AOA accuracy at the frequency measured by the IFM circuit 1300. In some embodiments, the signal generator circuit 1302 may be detachably coupled to the zero-balance phase measurement circuit 200 using coaxial connectors or the like at the inputs to the hybrid couplers 202, 204. For a dedicated IFM application, the signal generator circuit 1302 may be integrated on the same substrate (e.g., PCB) as the zero-balance phase measurement circuit 200.

In one or more embodiments, the signal generator circuit 1302 comprises a power divider 1304 configured to receive RF signals from an antenna 1306 coupled to an input of the power divider 1304. The antenna 1306 may be detachably coupled to the power divider 1304 using a compatible connector (e.g., coaxial connector, etc.). The power divider 1304 includes first and second outputs and is configured to generate first and second output signals at the first and second outputs, respectively, that are attenuated versions (e.g., 3 dB or half power) of the received RF signal at the input of the power divider 1304. The power divider 1304 may be a Wilkinson type power divider where the two output ports are equally balanced (0 phase) between ports, or it may be a hybrid combiner with 0- and 90-degree phase ports that will add or subtract delay depending on where the 90 degree or 0 degree phase shift is placed in line with a delay circuit 1308, respectively. The type of power divider 1304 selected may depend on how close the center of the phase detector (e.g., 900 mV) can be matched to the center of the operating frequency band.

The first output signal generated by the power divider 1304 may be provided to a delay circuit 1308 configured to generate a delayed version of the first output signal. In this example, the delay circuit 1308 is configured to introduce a delay of 2 ns (for an operating frequency band of about 2.3 GHZ to 2.5 GHZ), although embodiments are not limited thereto; the delay introduced by the delay circuit 1308 may be a function of the operating frequency band. The delayed first output signal is provided to an input of the first hybrid coupler 202. The second output signal generated by the power divider 1304 may be provided to an input of the second hybrid coupler 204 without introducing a delay.

Figure 13B:
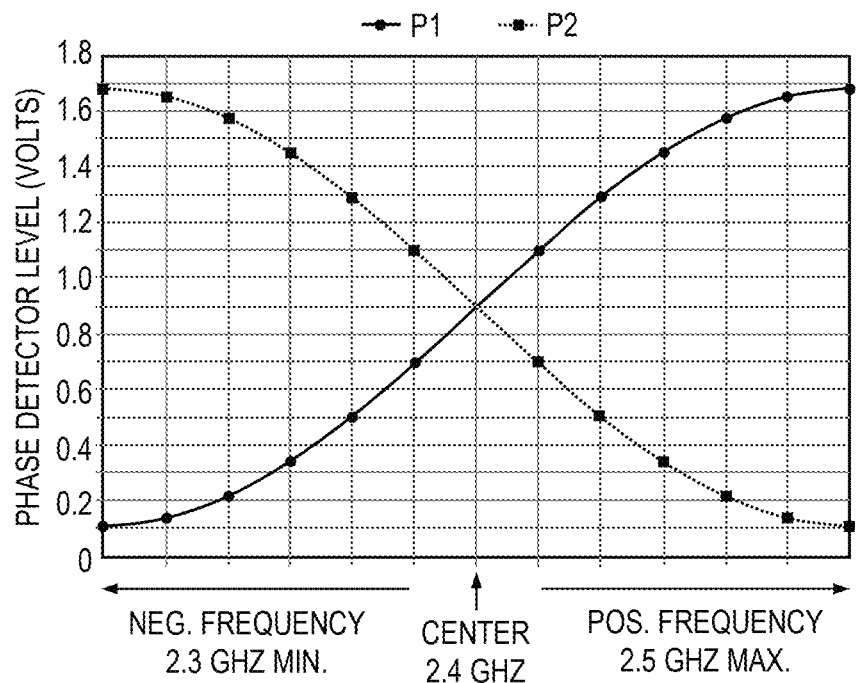
FIG. 13B is a graph depicting exemplary output signals generated by phase detectors in the illustrative zero-balance phase measurement circuit shown in FIG. 13A.

FIG. 13B is a notional graph depicting exemplary output signals P1 and P2 generated by the first and second phase detectors 210 and 212, respectively, of the zero-balance phase measurement circuit 200 shown in FIG. 13A. Referring to FIG. 13B, the output signals P1 and P2 will intersect at 0.9 V in this example (which assumes an output voltage swing for each phase detector 210, 212 of 0 to 1.8 V) at a center frequency on the order of about 2.4 GHz and the accuracy of setting the center frequency will depend on how close the center of the phase detector matches the frequency band center frequency as previously stated. When the first output signal P1 is less than about 0.9 V and when the second output signal P2 is greater than about 0.9 V, the IFM circuit 1300 indicates a negative frequency (to 2.3 GHZ minimum). Likewise, when the first output signal P1 is greater than about 0.9 V and the when the second output signal P2 is less than about 0.9 V, the IFM circuit 1300 indicates a positive frequency (to 2.5 GHz maximum).

Figure 14:
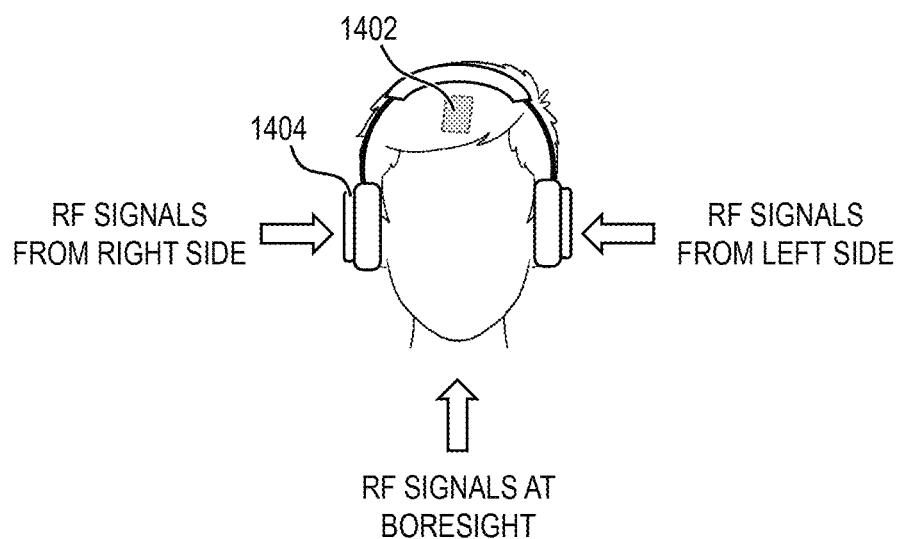
FIG. 14 is a conceptual view depicting a wearable application of the zero-balance phase measurement circuit configured for providing an audible indication of the direction of received signals, according to one or more embodiments of the inventive concept.

In another example of a suitable application for the zero-balance phase measurement circuit according to embodiments of the inventive concept, the first and second output signals P1 and P2 generated by the first and second phase detectors, respectively, may be used to tune audio voltage-controlled oscillators (VCOs) to provide an audible indication of the direction of a received signal. FIG. 14 is a conceptual view depicting a wearable (and portable) application of the zero-balance phase measurement circuit configured for providing an audible indication of the direction of received signals, according to one or more embodiments of the inventive concept.

Referring to FIG. 14, the zero-balance phase measurement circuit 1402, which may be implemented in a manner consistent with the illustrative zero-balance phase measurement circuit 1100 shown in FIG. 11, may be configured as a wearable device suitable for attachment, for example, to a hat or helmet worn by a user. In other embodiments, the zero-balance phase measurement circuit 1402 may be integrated into a hand-held device (e.g., stand-alone RDF device, GPS device, mobile phone, etc.). The zero-balance phase measurement circuit 1402 may be configured to generate audio output signals that are provided to left and right speakers of a pair of headphones 1404 worn by the user. In some embodiments, the zero-balance phase measurement circuit 1402 may be attached to the headphones 1404 (e.g., using the headphones as a support base for the zero-balance phase measurement circuit 1402).

The zero-balance phase measurement circuit 1402 may be configured such that RF signals received from the right side of the user are converted to an audio signal presented to the user through the right speaker of the headphones 1404, and RF signals received from the left side of the user are converted to an audio signal presented to the user through the left speaker of the headphones 1404. RF signals received at boresight (i.e., directly in front of or behind the user) may be converted to an audio signal heard separately through the right speaker and the left speaker of the headphones 1404 as the RF signal changes angle of arrival near the cross-over point at which the first and second output signals P1 and P2 of the two phase detectors (210, 212 in FIG. 2) intersect.

Figure 15:
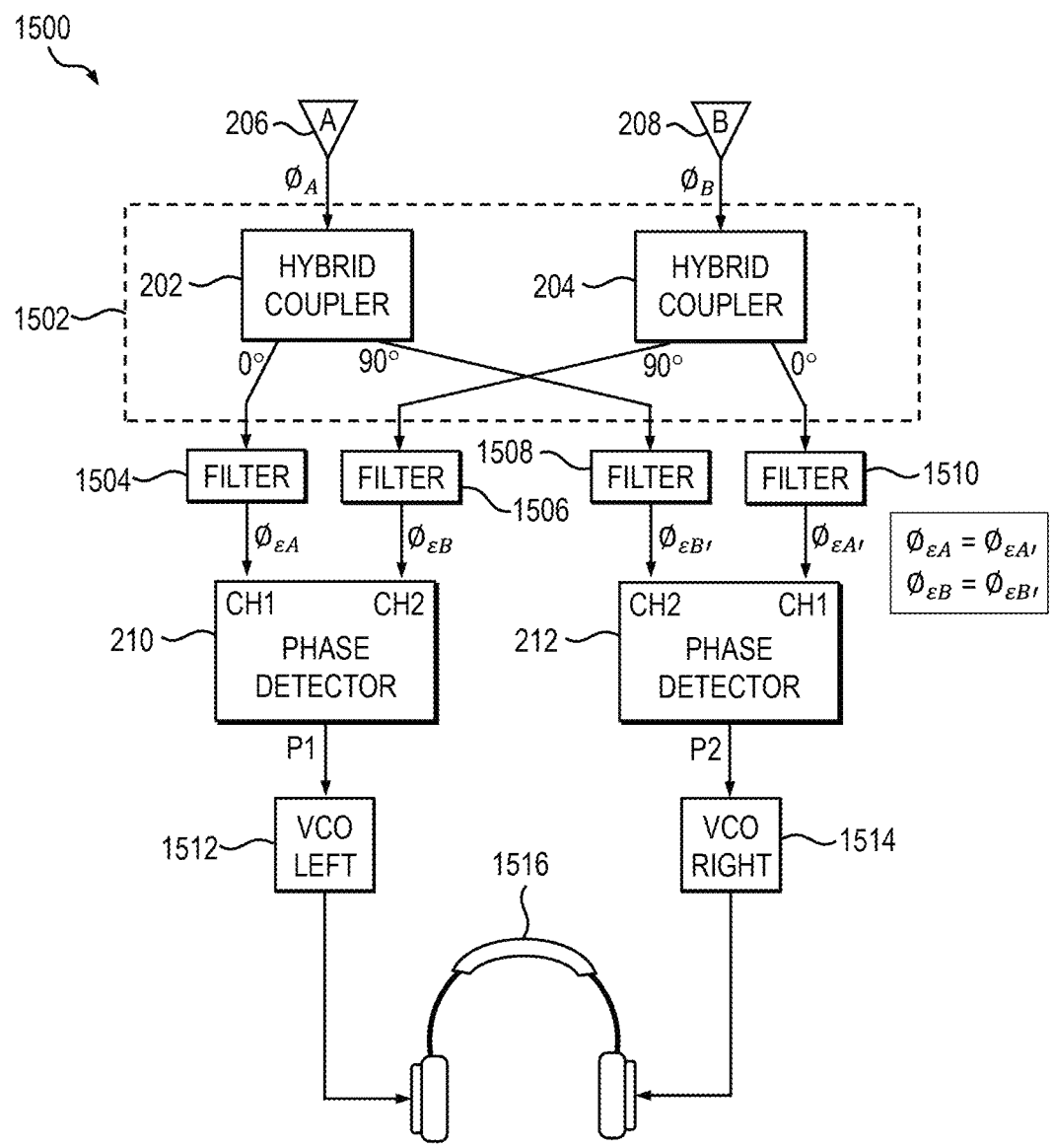
FIG. 15 is a schematic block diagram depicting a zero-balance phase measurement circuit configured for implementing an audible indication of the direction of received signals, according to one or more embodiments of the inventive concept.

FIG. 15 is a schematic block diagram depicting an audible zero-balance phase measurement circuit 1500 configured for presenting an audible indication of the direction of received RF signals, according to one or more embodiments. Referring to FIG. 15, the audible zero-balance phase measurement circuit 1500 includes a pair of cross-connected hybrid couplers 202 and 204, which may be consistent with the first and second hybrid couplers 202, 204 shown in FIG. 2. The audible zero-balance phase measurement circuit 1500 may further include a plurality of filters connected in the respective signal paths provided to the inputs of first and second phase detectors 210 and 212, which may be consistent with the first and second phase detectors 210, 212 shown in FIG. 2. Specifically, a first filter 1504 is configured to receive the zero-degree output signal from the first hybrid coupler 202 and to generate a first filtered signal, $\theta_{\epsilon A}$, which is provided to the first input CH1 of the first phase detector 210. A second filter 1506 is configured to receive the 90-degree output signal from the second hybrid coupler 204 and to generate a second filtered signal, $\theta_{\epsilon B}$, which is provided to the second input CH2 of the first phase detector 210. A third filter 1508 is configured to receive the 90-degree output signal from the first hybrid coupler 202 and to generate a third filtered signal, $\theta_{\epsilon B'}$, which is provided to the second input CH2 of the second phase detector 212. A fourth filter 1510 is configured to receive the zero-degree output signal from the second hybrid coupler 204 and to generate a fourth filtered signal, $\theta_{\epsilon A'}$, which is provided to the first input CH1 of the second phase detector 212.

The first phase detector 210 may be configured to generate a first output signal, P1, which is indicative of a phase difference between the respective signals provided to the first and second inputs CH1, CH2 of the first phase detector 210. The first output signal P1 may be expressed as follows:

$$P1 = \Delta\theta_{P1} = \theta_{\epsilon A} - \theta_{\epsilon B} \quad (4)$$

Likewise, the second phase detector 212 may be configured to generate a second output signal, P2, which is indicative of a phase difference between the respective signals provided to the first and second inputs CH1, CH2 of the second phase detector 212. The second output signal P2 may be expressed as follows:

$$P2 = \Delta\theta_{P2} = \theta_{\epsilon A'} - \theta_{\epsilon B'} \quad (5)$$

The first output signal P1 generated by the first phase detector 210 may be provided to an input of a first VCO 1512, which may be a left VCO. The second output signal P2 generated by the second phase detector 212 may be provided to an input of a second VCO 1514, which may be a right VCO. Each of the VCOs 1512, 1514 may be implemented as a voltage-to-frequency converter (VFC) configured to generate an output signal whose oscillation frequency is linearly controlled by the voltage at its input; that is, the applied input voltage to the VCO determines the instantaneous oscillation frequency of the VCO. In one or more embodiments, each of the first and second VCOs 1512, 1514 may configured to generate an audio output signal perceivable by a human user (e.g., in a frequency range of about 20 Hz-20 KHz). A first audio output signal generated by the first VCO 1512 may be provided to a left speaker (or other audible indicator) of a pair of headphones 1516, and a second audio signal generated by the second VCO 1514 may be provided to a right speaker of the pair of headphones 1516. In an example embodiment, the VCO frequency range is about 375 Hz to 500 Hz boresight to end-fire, respectively, and both channels (left and right) are matched. It is to be understood, however, that embodiments of the inventive concept are not limited to any specific frequency range.

Although an audible indication of the direction of a received signal has been described in detail herein with reference to FIGS. 14 and 15, it is to be appreciated that other indication means are similarly contemplated according to other embodiments of the inventive concept. For example, the output signals P1, P2 generated by the first and second phase detectors 210, 212 may be configured to provide other sensory indications to a user, such as a visual indication (e.g., by converting the output signals P1, P2 indicative of phase difference to light intensity and/or color variations using an appropriate visual indicator device) and/or tactile indication (e.g., by converting the output signals P1, P2 indicative of phase difference to tactile feedback using an appropriate tactile device), as will become apparent to those skilled in the art given the teachings herein. These other indication means may be used in place of or in addition to the illustrative audible indication embodiments described in conjunction with FIGS. 14 and 15.

Figure 16:
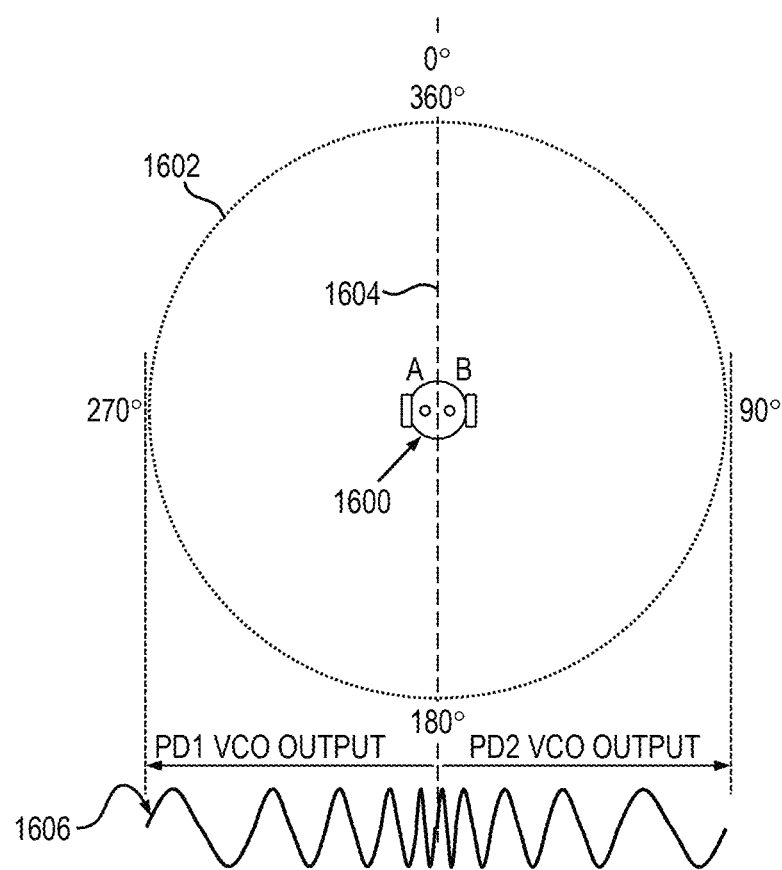
FIG. 16 is a conceptual diagram depicting a top view looking down on an azimuthal plane of the zero-balance phase measurement circuit used to provide an audible indication of the direction of an RF signal, according to one or more embodiments of the inventive concept.

FIG. 16 is a conceptual diagram depicting a top view looking down on an azimuthal plane of the zero-balance phase measurement circuit used to provide an audible indication of the direction of an RF signal, according to one or more embodiments. Referring to FIG. 16, a user 1600 is shown in a top plan view facing toward zero degrees in the center of an azimuthal plane 1602. The zero-balance phase measurement circuit may be attached to a helmet worn by the user 1600. A first receiving antenna, A, of the zero-balance phase measurement circuit may be associated with the left side of the user 1600 and a second receiving antenna, B, of the zero-balance phase measurement circuit may be associated with the right side of the user 1600. A center line 1604 dividing left and right hemispheres (between 0 and 180 degrees) represents the separation between left ear and right coverage zones.

RF signals arriving in the 180-degrees to 360-degrees coverage zone (i.e., left hemisphere) will be converted by the zero-balance phase measurement circuit into audio tones heard only in the left car of the user 1600. RF signals arriving in the 0-degree to 180-degrees coverage zone (i.e., right hemisphere) will be converted by the zero-balance phase measurement circuit into audio tones heard only in the right car of the user 1600. Waveform 1606 represents a frequency of audio tones generated by the zero-balance phase measurement circuit as a function of distance from boresight (0/360 degrees and 180 degrees in the azimuthal plane 1602). Waveform 1606 indicates that the audio tones will increase (or decrease) in frequency as the RF signals arrive near boresight and will decrease (or increase) in frequency as the RF signals move toward end-fire (90 degrees and 270 degrees in the azimuthal plane 1602).

It will be understood that, although ordinal terms such as first, second, etc., may be used herein to describe various elements and/or steps, these elements and/or steps should not be limited by such terms. Rather, these terms are only used to distinguish one element from another and are not intended to convey a particular order unless explicitly stated otherwise. For example, a first element could be termed a second element, and, similarly, a second element could be termed a first element, without departing from the scope of the present disclosure. As used herein, the term "and/or" includes any and all combinations of one or more of the associated listed items.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," as may be used herein, are intended to specify the presence of stated features, integers, steps, operations, elements, and/or components, but do not necessarily preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below," "above," "upper," "lower," "horizontal," "lateral," and/or "vertical," may be used herein to describe a relationship of one element, layer or region to another element, layer or region as illustrated in the figures. It will be understood, however, that these terms are intended to encompass different orientations of the device in place of or in addition to the orientation depicted in the figures.

Like numbers refer to like elements throughout the several drawings. Thus, the same or similar numbers may be described with reference to other drawings even if they are neither mentioned nor described in the corresponding drawing. Also, elements that are not denoted by reference numbers may be described with reference to other drawings.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A zero-balance phase measurement apparatus, comprising:
    a first hybrid coupler comprising a first input port configured to receive a first radio frequency (RF) signal from a first receiving element, and first and second output ports, the second output port generating a 90-degree phase shift relative to the first output port; and
    a second hybrid coupler comprising a second input port configured to receive an RF signal from a second receiving element, and third and fourth output ports, the fourth output port generating a 90-degree phase shift relative to the third output port,
    wherein the first output port is coupled to a first input of a first phase detector, the second output port is coupled to a second input of a second phase detector, the third output port is coupled to a first input of the second phase detector, and the fourth output port is coupled to a second input of the first phase detector, and
    wherein the zero-balance phase measurement apparatus is configured to generate a zero-balance phase output signal as a function of first and second phase difference signals generated by the first and second phase detectors, respectively, the first phase difference signal being indicative of a phase difference between respective signals at the first and second inputs of the first phase detector, and the second phase difference signal being indicative of a phase difference between respective signals at the first and second inputs of the second phase detector.

2. The apparatus of claim 1, further comprising:
    a first antenna connected to the first input port of the first hybrid coupler and configured to receive the first RF signal; and
    a second antenna connected to the second input port of the second hybrid coupler and configured to receive the second RF signal.

3. The apparatus of claim 2, wherein each of the first and second antennas comprises a planar sleeve dipole antenna, and wherein the first and second antennas are spaced apart from each other by a distance equal to about one-quarter wavelength to about one-half wavelength, measured between the first and second RF signals.

4. The apparatus of claim 3, wherein the first and second antennas, the first and second phase detectors, and the first and second hybrid couplers are integrated together on a same substrate.

5. The apparatus of claim 2, wherein a spacing between the first and second antennas is less than or equal to about one-quarter wavelength of the first or second RF signal.

6. The apparatus of claim 2, wherein the first and second phase detectors and the first and second hybrid couplers are integrated together on a first substrate, and wherein the first and second antennas are integrated on a second substrate and configured to be detachable from the first and second hybrid couplers, respectively.

7. The apparatus of claim 1, wherein the first and second phase detectors and the first and second hybrid couplers are integrated together on a same substrate.

8. The apparatus of claim 1, further comprising:
    a first filter electrically connected between the first receiving element and the first input port of the first hybrid coupler; and
    a second filter electrically connected between the second receiving element and the second input port of the second hybrid coupler.

9. The apparatus of claim 1, further comprising:
first and second filters; and
first and second amplifiers,
wherein the first filter and the first amplifier are connected in series in a first signal path between the first receiving element and the first input port of the first hybrid coupler, and
wherein the second filter and the second amplifier are connected in series in a second signal path between the second receiving element and the second input port of the second hybrid coupler.

10. The apparatus of claim 1, wherein the zero-balance phase measurement apparatus further comprises a processor configured to determine a phase error correction value by subtracting a measured average phase value from an ideal phase value, and to generate corrected first and second measured output phase voltages by adding the phase error correction value to initial measured first and second phase difference signals generated by the first and second phase detectors, respectively.

11. The apparatus of claim 10, wherein the processor, the first and second phase detectors and the first and second hybrid couplers are integrated together on a same substrate.

12. The apparatus of claim 10, wherein the processor is further configured to determine first and second phase difference signals at zero degrees across a frequency band of operation for the zero-balance phase measurement apparatus.

13. A wearable sensor for tracking a direction of radio frequency (RF) signals, the sensor comprising:
a first hybrid device comprising a first input port configured to receive a first RF signal from a first receiving element, and first and second output ports, the first hybrid device being configured to generate a zero-degree phase shift of the first RF signal at the first output port and to generate a 90-degree phase shift of the first RF signal at the second output port;
a second hybrid device comprising a second input port configured to receive a second RF signal from a second receiving element, and third and fourth output ports, the second hybrid device being configured to generate a zero-degree phase shift of the second RF signal at the third output port and to generate a 90-degree phase shift of the second RF signal at the fourth output port;
first and second phase detectors; and
first and second voltage-controlled oscillators (VCOs) operatively coupled to the first and second phase detectors, respectively,
wherein the first output port is coupled to a first input of the first phase detector, the second output port is coupled to a second input of the second phase detector, the third output port is coupled to a first input of the second phase detector, and the fourth output port is coupled to a second input of the first phase detector,
wherein the first VCO is configured to generate a first output signal as a function of a phase difference between respective signals at the first and second inputs of the first phase detector,
wherein the second VCO is configured to generate a second output signal as a function of a phase difference between respective signals at the first and second inputs of the second phase detector, and
wherein the direction of the RF signals is obtained as a function of the first and second output signals.

14. The wearable sensor of claim 13, further comprising:
a first antenna connected to the first input port of the first hybrid device and configured to receive the first RF signal; and
a second antenna connected to the second input port of the second hybrid device and configured to receive the second RF signal.

15. The wearable sensor of claim 14, wherein each of the first and second antennas comprises a planar sleeve dipole antenna, and wherein the first and second antennas are spaced apart from each other by about one-quarter wavelength to about one-half wavelength of the first or second RF signal.

16. The wearable sensor of claim 13, wherein the first and second phase detectors and the first and second hybrid devices are integrated together on a same substrate.

17. The wearable sensor of claim 13, further comprising:
a first filter connected between the first receiving element and the first input port of the first hybrid device; and
a second filter connected between the second receiving element and the second input port of the second hybrid device.

18. The wearable sensor of claim 13, further comprising:
first and second filters; and
first and second amplifiers,
wherein the first filter and the first amplifier are connected in series in a first signal path between the first receiving element and the first input port of the first hybrid device, and
wherein the second filter and the second amplifier are connected in series in a second signal path between the second receiving element and the second input port of the second hybrid device.

19. The wearable sensor of claim 13, wherein the first and second output signals generated by the first and second VCOs, respectively, are provided to at least one of an audible indicator, a visual indicator, or a tactile indicator, the least one of the audible indicator, the visual indicator, or the tactile indicator configured to provide an audible, visual, or tactile indication, respectively, of the direction of the RF signals.

20. A zero-balance phase measurement circuit, comprising:
a first hybrid coupler comprising a first input port configured to receive a first radio frequency (RF) signal from a first receiving element, and first and second output ports, the second output port having a 90-degree phase with respect to the first output port;
a second hybrid coupler comprising a second input port configured to receive a second RF signal from a second receiving element, and third and fourth output ports, the fourth output port having a 90-degree phase with respect to the third output port;
a first phase detector comprising first and second inputs and a first output, the first phase detector generating a first phase difference signal at the first output that is indicative of a phase difference between respective signals at the first and second inputs thereof; and
a second phase detector comprising third and fourth inputs and a second output, the second phase detector generating a second phase difference signal at the second output that is indicative of a phase difference between respective signals at the third and fourth inputs thereof,
wherein the first output port is coupled to the first input of the first phase detector, the second output port is coupled to the fourth input of the second phase detector, the third output port is coupled to the third input of the second phase detector, and the fourth output port is coupled to the second input of the first phase detector, and wherein the zero-balance phase measurement circuit is configured to generate a zero-balance phase output signal as a function of a mutually opposite or polarity difference between the first and second phase difference signals.

21. The circuit of claim 20, wherein the first receiving element comprises a first planar sleeve dipole antenna and the second receiving element comprises a second planar sleeve dipole antenna, the first and second planar sleeve dipole antennas being spaced apart from each other by a distance equal to one-quarter wavelength to one-half wavelength of a frequency of operation of the zero-balance phase measurement circuit.

22. A method of determining angle of arrival of a radio frequency (RF) signal, the method comprising:

measuring a first phase difference signal and a second phase difference signal generated by first and second phase detectors, respectively;

determining an average phase difference voltage of the first and second phase difference signals;

calculating a phase error correction value by subtracting the average phase difference voltage from an ideal zero phase value;

generating corrected first and second phase difference signals by adding the phase error correction value to the measured first and second phase difference signals; and determining a final phase value based on the corrected first and second phase difference signals.

23. A method of tracking a direction of a radio frequency (RF) signal, the method comprising:

providing a first hybrid device configured to receive a first RF signal and to generate a zero-degree phase shift of the first RF signal at a first output port and to generate a 90-degree phase shift of the first RF signal at a second output port;

providing a second hybrid device configured to receive a second RF signal and to generate a zero-degree phase shift of the second RF signal at a third output port and to generate a 90-degree phase shift of the second RF signal at a fourth output port;

generating a first phase difference signal by comparing the zero-degree phase shift of the first RF signal and the 90-degree phase shift of the second RF signal;

generating a second phase difference signal by comparing the zero-degree phase shift of the second RF signal and the 90-degree phase shift of the first RF signal;

generating a first output signal whose oscillation frequency is controlled as a function of the first phase difference signal; and generating a second output signal whose oscillation frequency is controlled as a function of the second phase difference signal, wherein the direction of the RF signal is obtained as a function of the first and second output signals.

* * * * *